(12) United States Patent
Matsudo

(10) Patent No.: US 7,563,516 B2
(45) Date of Patent: Jul. 21, 2009

(54) THERMOPLASTIC RESIN SHEET AND LAMINATE

(75) Inventor: Masaki Matsudo, Koka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 187 days.

(21) Appl. No.: 10/551,460

(22) PCT Filed: Apr. 5, 2005

(86) PCT No.: PCT/JP2005/006673

§ 371 (c)(1),
(2), (4) Date: Sep. 30, 2005

(87) PCT Pub. No.: WO2006/038332

PCT Pub. Date: Apr. 13, 2006

(65) Prior Publication Data

US 2007/0014976 A1    Jan. 18, 2007

(30) Foreign Application Priority Data

Oct. 1, 2004 (JP) ............................. 2004-290488
Feb. 22, 2005 (JP) ............................. 2005-046118

(51) Int. Cl.
*B32B 27/00* (2006.01)
(52) U.S. Cl. .................... 428/506; 428/520; 428/524
(58) Field of Classification Search ............... 428/506, 428/520, 524
See application file for complete search history.

(56) References Cited

FOREIGN PATENT DOCUMENTS

| JP | 05-085782 | * | 4/1993 |
|---|---|---|---|
| JP | 5-104687 | | 4/1993 |
| JP | 07-097240 | * | 4/1995 |
| JP | 09-156967 | * | 6/1997 |
| JP | 10-045438 | * | 2/1998 |
| JP | 2000-319044 | * | 11/2000 |
| WO | WO-03/097347 | | 11/2003 |
| WO | WO03/097347 | * | 11/2003 |

OTHER PUBLICATIONS

International Search Report.

* cited by examiner

*Primary Examiner*—Leszek Kiliman
(74) *Attorney, Agent, or Firm*—Cheng Law Group PLLC

(57) ABSTRACT

A thermoplastic resin sheet is provided which has good penetration resistance over a range from low to high temperature region and can be used as an intermediate film of a laminated glass.

The thermoplastic resin sheet has such a layered structure that a first polyvinyl acetal resin layer (A) is provided on each side of a second polyvinyl acetal resin layer (B). The first polyvinyl acetal resin layer (A) is comprised mainly of an acetalized product of polyvinyl alcohol with aldehyde (a) having 4-6 carbon atoms. The second polyvinyl acetal resin layer (B) is comprised mainly of a coacetalized product of polyvinyl alcohol with aldehyde (a) having 4-6 carbon atoms and aldehyde (b) having 1-3 carbon atoms. A polymer unit (X) derived from the aldehyde (a) and a polymer unit (Y) derived from the aldehyde (b), in total, account for at least 55% by mole while the first polymer unit (X) alone accounts for 0.5-80% by mole of the total of the coacetalized product.

31 Claims, 1 Drawing Sheet

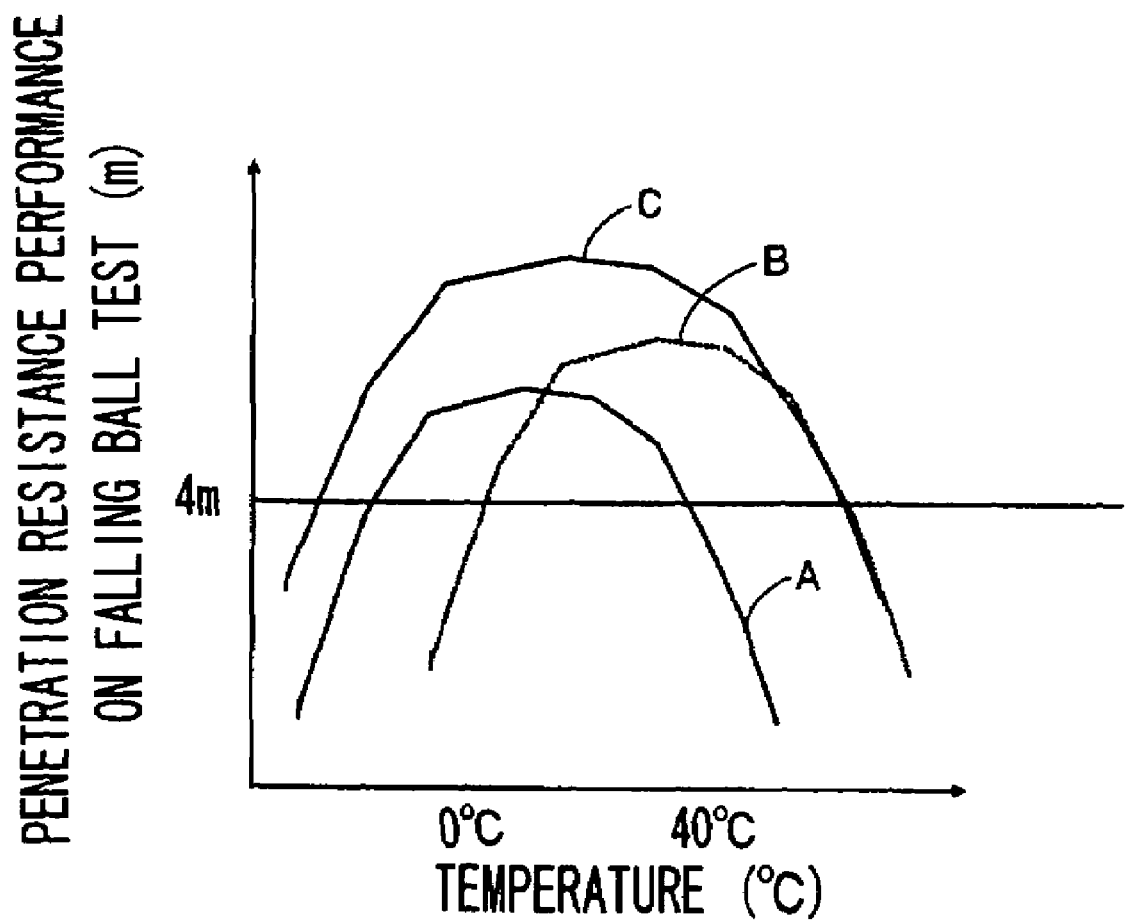

THERMOPLASTIC RESIN SHEET AND LAMINATE

The present application claims priority based on Japanese Patent Application No. 2004-290488, filed Oct. 1, 2004, the entirety of which is incorporated herein by reference. The present application additionally claims priority based on Japanese Patent Application No. 2005-046118, filed Feb. 22, 2005, the entirety of which is incorporated herein by reference.

TECHNICAL FIELD

The present invention relates to a thermoplastic resin sheet having a structure made of layers of different types of polyvinyl acetal resins and a laminate using the thermoplastic resin sheet, and more specifically to a thermoplastic resin sheet suitable for use as an intermediate film of a laminated glass in vehicles and a laminate using the thermoplastic resin sheet.

BACKGROUND ART

Laminated glass has been widely used as a glass that is mounted to windows in transportation systems, e.g., automobiles, railway vehicle and aircrafts, and architectural structures. Such a laminated glass includes a thermoplastic resin sheet, as an intermediate film interposed between a transparent first glass plate or resin plate and a transparent second glass plate or resin plate. Interposition of the thermoplastic resin sheet makes the laminated glass difficult to crack.

The below-specified Patent Literature 1 discloses a laminated glass, particularly for use as an aircraft window glass, which includes two glass plates and a thermoplastic resin sheet composed of PVB (polyvinyl butyral resin) and interposed between them. This thermoplastic resin sheet has a three-layer structure consisting of a PVB internal layer and PVB surface layers disposed opposite sides of the internal layer. Also, the ratio in plasticizer content of the surface layer to the surface layer is adjusted to 1.2-3.

In the laminated glass described in Patent Literature 1, the surface layer is rendered higher in plasticizer content than the internal layer so that the elastic modulus of the surface layer is maintained at a relatively low level. This window glass, because of its use of the above-described thermoplastic resin sheet, is described to exhibit superior impact resistance even at low temperatures. Particularly, the glass plate when chemically strengthened is easier to crack than when thermally tempered, because the former is less compressed than the latter. This has been a problem. However, the use of the thermoplastic resin sheet is described to reduce the occurrence of cracks in the glass plate even when chemically strengthened.

Like Patent Literature 1, the below-specified Patent literature 2 discloses a laminated glass, for use in vehicles, which uses a thermoplastic resin sheet made of PVB resin layers. This thermoplastic resin sheet has a relatively hard PVB inner layer having a Tg of 35-60° C. and PVB outer layers having a Tg of 32-35° C. and disposed on opposite sides of the inner layer. These outer layers are rendered relatively soft as a result of plasticization with addition of a plasticizer.

The Patent Literature 2 describes that the placement of such outer layers on the opposite sides of the above-described inner layer results in the provision of a laminated glass which is stable and exhibits superior mechanical strength.

Patent Literature 1: Japanese Patent Registration No. 3300402

Patent Literature 2: WO 03/097347 A1

DISCLOSURE OF THE INVENTION

Laminated glass is widely used as a safety glass for vehicles, e.g., automobiles, and a high penetration resistance is strongly demanded for this type of laminated glass. In our country, a testing method of safety glass for automobiles is defined in JIS R 3212, for example. According to JIS R 3212, a penetration resistance is measured by providing a laminated glass sample having an area of about 300×300 mm, maintaining the sample in a room at 23±2° C. for over 4 hours and allowing a steel ball, having a mass of 2260±20 g and diameter of about 82 mm and located 4 m above the sample, to fall on a central part of the sample. It is required that the falling steel ball should not penetrate the laminated glass.

The penetration resistance also becomes important in protecting money and valuables in a car against thieves. That is, a thief strikes a window glass into pieces using a hammer or the like, and steal money and valuables left inside a car. The window glass, if low in penetration resistance, can be broken easily. However, the window glass if high in penetration resistance is hard to break even when a considerable number of blows is applied thereto with a hammer. Then, it becomes more likely that neighbors hear or witness an operation that the thief breaks the window glass. The difficulty to break the window glass increases a possibility that the thief abandons his or her attempt. Therefore, a high penetration resistance is strongly demanded for window glasses to insure protection against theft.

In some occasions, a thing scattered in the wind drops on a window glass of a running car from ahead or above and applies an impact thereon from an outside of the car to break the window glass. In other occasions, a car crash causes breakage of a window glass. In such occasions, glass fragments scattered by the impact may cause a serious damage to passengers inside a car. In order to assure safety of passengers in a car, it is required that a glass, even when it breaks upon application of an impact, neither separates nor scatters toward an inside of a car.

In accordance with the above-described test method, evaluation is made at a temperature of 23±2° C. However, an actual laminated glass for cars is exposed to an environment that, for example, covers a low temperature range including a frozen point and relatively high temperatures over 30° C. Therefore, there is a strong demand for a laminated glass which exhibits good penetration resistance over such a wide temperature range.

A method is known for fabricating a laminated glass with good penetration resistance by laminating plural resin films of different types, such as polyethylene terephthalate, polycarbonate and ionomer. This method however encounters the following problems. Laminating of plural resin films on a glass adds to complexity of an operation. In addition, an image passing through the laminated glass is distorted by an optical strain produced in the case where the laminated resin films fail to provide flat boundaries. Further, there are some resin types that are not adherent in nature to a PVB resin.

Increasing a thickness of an intermediate film is also effective in improving penetration resistance. However, this method disadvantageously increases a weight of the laminate and does not suit weight reduction that is required to improve a gas mileage. Also, the thicker laminated glass is harder to handle, which has been another disadvantage.

Another method used to improve penetration resistance involves increasing a thickness of a constituent glass of a laminated glass. This method however increases a weight of the laminated structure and does not contribute to weight reduction of a car. As described above, it has been very difficult for conventional methods to realize weight reduction of a car without a drop of penetration resistance.

The above-described Patent Literatures 1 and 2 disclose a laminated glass which includes a thermoplastic resin sheet having an inner PVB layer interposed between outer PVB layers. The outer layers are rendered higher in plasticizer content than the inner layer to increase a strength of the inner layer and thereby improve a mechanical strength of the laminated glass.

However, a thermoplastic resin sheet generally shows temperature dependence. When exposed to a low temperature, a thermoplastic resin exhibits a high maximum stress and a low elongation and thus becomes brittle. In contrast, when exposed to a high temperature, it exhibits a high elongation and a low maximum stress and thus becomes too soft. In either cases, its impact resistance is low. The laminated glass constructions described in Patent Literatures 1 and 2 have a drawback that the thermoplastic resin sheet exhibits insufficient impact resistance particularly in a low temperature range.

Also in the configurations described in Patent Literatures 1 and 2, the inner and outer layers are all composed of the same resin, PVB. The mechanical strength of the inner layer is only rendered relatively high simply by differentiating plasticizer contents.

In the fabrication of a laminated glass, an autoclave process in which a treatment is carried out at high pressures and temperatures is generally used in order to fabricate a laminated glass with a good appearance. In the case where a thermoplastic resin film consisting of plural layers composed of the same PVB, as described in Patent Literatures 1 and 2, is used in the autoclave process, if the inner and outer layers have the same resin composition, the high-temperature high-pressure treatment induces homogenization and simply results in the provision of a single-layer thermoplastic resin sheet containing low parts of plasticizer. That is, migration of plasticizer from the outer layers to the inner layer occurs to provide the single-layer thermoplastic resin sheet having a low plasticizer content as a whole. The thermoplastic resin sheet comprising the single-layer PVB sheet having a low plasticizer content shows high penetration resistance at high temperatures but inevitably shows extremely low penetration resistance at low temperatures. Accordingly, it disadvantageously fails to assure good penetration resistance in the all temperature range encompassing low and high temperature ranges.

Migration of the plasticizer is hard to occur if the high-temperature high-pressure treatment in the autoclave process is carried out in a mild fashion. However, in such a case, the mild treatment likely results in the difficulty to provide sufficient adhesion between the inner and outer layers.

In the laminated glasses described in Patent Literatures 1 and 2, the thermoplastic resin sheet was comprised solely of a PVB resin. In order for the inner and outer layers to have different physical properties, they must be processed to have difference degrees of butyralation in PVB. Alternatively, polyvinyl alcohol (hereinafter abbreviated as PVA) having a high acetyl content, as a raw material, must be used to prepare a PVB resin having a high acetyl content.

With the plasticizer content being constant, PVB having a lower degree of butyralation becomes harder and can enhance penetration resistance. However, an allowable plasticizer content decreases with an increasing degree of butyralation in PVB. The attempt to incorporate a plasticizer in the amount larger than allowable causes bleedout resulting in inferior bond performance and extremely poor appearance. Since a significant penetration resistance improving effect does not result from the simple reduction of butyralation degree, the plasticizer content of the inner layer must be reduced or the thickness ratio of the inner layer to the others must be increased to enhance a mechanical strength of the inner layer. However, such plasticizer content reduction or thickness ratio increase of the inner layer further increases its hardness to result in a marked reduction of penetration resistance at low temperatures.

As discussed above, the laminated glasses described in Patent Literatures 1 and 2 have virtually gained an insufficient increase in penetration resistance and failed to assure good penetration resistance over an entire wide temperature range encompassing low and high temperatures.

In order to improve penetration resistance of PVB at low temperatures, a certain amount of a plasticizer must be loaded in PVB. However, there has been a problem that at higher plasticizer loadings, its penetration resistance increases in the low temperature range but decreases in the high temperature range.

In addition, PVB tends to become more flexible as its acetyl content increases, provided that the plasticizer content remains unchanged. Accordingly, the use of PVB having a high acetyl content renders the inner layer less prone to become harder in the low temperature range and imparts good penetration resistance thereto. It however renders the inner layer more prone to become too soft in the high temperature range and lowers its penetration resistance at high temperatures.

In view of the current state of the above-described prior art, it is an object of the present invention to provide a thermoplastic resin sheet which comprises plural superimposed resin layers composed mainly of polyvinyl acetal, has superior penetration resistance over a range from low to high temperature and can be used as an intermediate film of a laminated glass for automobiles, railway vehicles, aircrafts and architectural structures, as well as providing a laminate using the thermoplastic resin sheet.

A first invention is a thermoplastic resin sheet which has a laminated structure including a first polyvinyl acetal resin layer (A) and a second polyvinyl acetal resin layer (B). Characteristically, the first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms. The second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-6 carbon atoms and at least one aldehyde (b) selected from the group consisting of aldehydes having 1-3 carbon atoms. The thermoplastic resin sheet has such a structure that the first polyvinyl acetal resin layer (A) is provided on each side of at least one second polyvinyl acetal resin layer (B). In the second polyvinyl acetal resin layer (B), a polymer unit (X) and a polymer unit (Y), in total, account for at least 55% by mole while the first polymer unit (X) alone accounts for 0.5-80% by mole of the total of the coacetalized product, wherein the polymer unit (X) is an acetalized unit derived from the first aldehyde (a) and the polymer unit (Y) is an acetalized unit derived from the second aldehyde (b).

In this specification, coacetalization refers to a reaction in which polyvinyl alcohol is acetalized, either simultaneously or sequentially, using plural types of acetals, particularly at least one aldehyde (a) selected from the group consisting of aldehydes having 4-6 carbon atoms and at least one aldehyde (b) selected from the group consisting of aldehydes having 1-3 carbon atoms. The coacetalized product refers to polyvinyl acetal obtained via coacetalization of polyvinyl alcohol with the above-specified aldehydes, and includes the acetalized unit derived from the aldehyde (a) and the acetalized unit derived from the aldehyde (b). The acetalized unit derived from the aldehyde (a) is defined as the polymer unit (X) and the acetalized unit derived from the aldehyde (b) is defined as the polymer unit (Y), as described above. The polymer units (X) and (Y) do not mean polymer portions that constitute a copolymer but are meant to each indicate a polymer as a part of polyvinyl acetal. That is, the polymer unit (X) refers to a polymeric portion in polyvinyl acetal that results from acetalization of polyvinyl alcohol with the aldehyde (a).

A second invention is a thermoplastic resin sheet which has a laminated structure including a first polyvinyl acetal resin layer (A) and a second polyvinyl acetal resin layer (B). Characteristically, the first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms. The second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-6 carbon atoms and at least one aldehyde (b) selected from the group consisting of aldehydes having 1-3 carbon atoms. The thermoplastic resin sheet has such a structure that the first polyvinyl acetal resin layer (A) is provided on each side of at least one second polyvinyl acetal resin layer (B). In the second polyvinyl acetal resin layer (B), a polymer unit (X) and a polymer unit (Y), in total, account for at least 55% by mole while the first polymer unit (X) alone accounts for 20-80% by mole of the total of the coacetalized product, wherein the polymer unit (X) is an acetalized unit derived from the first aldehyde (a) and the polymer unit (Y) is an acetalized unit derived from the second aldehyde (b).

A third invention is a thermoplastic resin sheet which has a laminated structure including a first polyvinyl acetal resin layer (A) and a second polyvinyl acetal resin layer (B). Characteristically, the first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms. The second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-6 carbon atoms and at least one aldehyde (b) selected from the group consisting of aldehydes having 1-3 carbon atoms. The thermoplastic resin sheet has such a structure that the first polyvinyl acetal resin layer (A) is provided on each side of at least one second polyvinyl acetal resin layer (B). In the second polyvinyl acetal resin layer (B), a polymer unit (X) and a polymer unit (Y), in total, account for at least 55% by mole while the first polymer unit (X) alone accounts for 0.5-20% by mole of the total of the coacetalized product, wherein the polymer unit (X) is an acetalized unit derived from the first aldehyde (a) and the polymer unit (Y) is an acetalized unit derived from the second aldehyde (b).

A fourth invention is a thermoplastic resin sheet which has a laminated structure including a first polyvinyl acetal resin layer (A) and a second polyvinyl acetal resin layer (B). Characteristically, the first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms. The second polyvinyl acetal resin layer (B) contains a plasticizer and a second polyvinyl acetal resin obtained via acetalization of polyvinyl alcohol with at least one aldehyde (b) selected from the group consisting of aldehydes having 1-3 carbon atoms. The thermoplastic resin sheet has such a structure that the first polyvinyl acetal resin layer (A) is provided on each side of at least one second polyvinyl acetal resin layer (B). The second polyvinyl acetal resin layer (B) has a degree of acetalization of at least 55 mole %.

In a particular aspect of the thermoplastic resin sheets in the first and second inventions, a ratio in mole of the polymer unit (Y) to the polymer unit (X) in the coacetalized product constituting the second polyvinyl acetal resin layer (B), i.e., polymer unit (Y)/polymer unit (X), does not exceed 3.5.

In a particular aspect of the thermoplastic resin sheets in the first and third inventions, a ratio in mole of the polymer unit (Y) to the polymer unit (X) in the coacetalized product constituting the second polyvinyl acetal resin layer (B), i.e., polymer unit (Y)/polymer unit (X), does not exceed 200.

In a further particular aspect of the thermoplastic resin sheet in accordance with any one of the first through fourth inventions (hereinafter referred to collectively as the present invention), a temperature t(A) at which a loss tangent tan δ measured at a frequency of 10 Hz for a sheet comprised solely of the polyvinyl acetal resin layer (A) shows a maximum value is in the range of 20-50° C., a temperature t(B) at which a loss tangent tan δ for a sheet comprised of the second polyvinyl acetal resin layer (B) shows a maximum value is in the range of 35-70° C., and t(B)-t(A) is in the range between 5° C. and 40° C.

In a further particular aspect of the thermoplastic resin sheet in accordance with the present invention, there exists an overlapping temperature region between a temperature range in which a loss tangent tan δ for a sheet comprised of the first polyvinyl acetal resin layer (A) is at least 0.3 and a temperature range in which a loss tangent tan δ for a sheet comprised of the second polyvinyl acetal resin layer (B) is at least 0.3.

In a further particular aspect of the thermoplastic resin sheets in accordance with the first and second inventions, it is more preferable that a temperature t(A) at which a loss tangent tan δ measured at a frequency of 10 Hz for a sheet comprised solely of the polyvinyl acetal resin layer (A) shows a maximum value is in the range of 20-50° C., a temperature t(B) at which a loss tangent tan δ for a sheet comprised of the second polyvinyl acetal resin layer (B) shows a maximum value is in the range of 40-65° C., and t(B)-t(A) is in the range between 5° C. and 25° C.

In a further particular aspect of the thermoplastic resin sheets in accordance with the first and second inventions, it is more preferable that there exists an overlapping temperature region between a temperature range in which a loss tangent tan δ for a sheet comprised of the first polyvinyl acetal resin layer (A) is at least 0.5 and a temperature range in which a loss tangent tan δ for a sheet comprised of the second polyvinyl acetal resin layer (B) is at least 0.5.

In a further particular aspect of the thermoplastic resin sheet in accordance with this invention, G'(B)/G'(A) is in the range of 1.0-10, wherein G'(A) is a shear storage modulus at 23° C. at 10 Hz of the first polyvinyl acetal resin layer (A) and G' (B) is a shear storage modulus at 23° C. at 10 Hz of the second polyvinyl acetal resin layer (B).

In a further particular aspect of the thermoplastic resin sheet in accordance with the present invention, a ratio in tear strength of the second polyvinyl acetal resin layer (B) to the first polyvinyl acetal resin layer (A), i.e., tear strength (B)/tear strength (A), is at least 1.1 when measured according to JIS K 7128.

In a further particular aspect of the thermoplastic resin sheet in accordance with the present invention, tensile modulus (B)/tensile modulus (A) is at least 1.1, wherein the tensile modulus (B) is a tensile modulus of the second polyvinyl acetal resin layer (B) and the tensile modulus (A) is a tensile modulus of the first polyvinyl acetal resin layer (A) when both measured at 23° C. at a tensile strain rate of 1,250%/min.

In a further particular aspect of the thermoplastic resin sheet in accordance with the present invention, breaking energy (B)/breaking energy (A) is at least 1.1, wherein the breaking energy (B) is a breaking energy of the second polyvinyl acetal resin layer (B) and the breaking energy (A) is a breaking energy of the first polyvinyl acetal resin layer (A) when both measured at 23° C. at a tensile strain rate of 1,250%/min.

In a further particular aspect of the thermoplastic resin sheet in accordance with the present invention, maximum point stress (B)/maximum point stress (A) is at least 1.0, wherein the maximum point stress (B) is a maximum point stress of the second polyvinyl acetal resin layer (B) and the maximum point stress (A) is a maximum point stress of the first polyvinyl acetal resin layer (A) when both measured at 23° C. at a tensile strain rate of 1,250%/min.

In a further particular aspect of the thermoplastic resin sheet in accordance with the present invention, PVA polymerization degree (B)/PVA polymerization degree (A) is in the range of 0.5-3.0, wherein the PVA polymerization degree (B) is a degree of polymerization of polyvinyl alcohol for constituting the second polyvinyl acetal resin layer (B) and the PVA polymerization degree (A) is a degree of polymerization of polyvinyl alcohol for constituting the first polyvinyl acetal resin layer (A).

In a further particular aspect of the thermoplastic resin sheet in accordance with the present invention, PVA polymerization degree (B)/PVA polymerization degree (A) is in the range of 1.0-3.0.

In a further particular aspect of the thermoplastic resin sheet in accordance with the present invention, the ester group content of the second polyvinyl acetal resin layer (B) does not exceed 40% by mole.

In a further particular aspect of the thermoplastic resin sheet in accordance with the present invention, the ester group content of the second polyvinyl acetal resin layer (B) does not exceed 20% by mole.

In a further particular aspect of the thermoplastic resin sheet in accordance with the present invention, plasticizer content (A)/plasticizer content (B) is in the range of 1.0-3.0, wherein the plasticizer content (A) is a plasticizer content of the first polyvinyl acetal resin layer (A) and the plasticizer content (B) is a plasticizer content of the second polyvinyl acetal resin layer (B).

In a further particular aspect of the thermoplastic resin sheet in accordance with the present invention, the first polyvinyl acetal resin layer (A) and/or the second polyvinyl acetal resin layer (B) contains functional fine particles.

In a further particular aspect of the thermoplastic resin sheet in accordance with the present invention, the first polyvinyl acetal resin layer (A) and/or the second polyvinyl acetal resin layer (B) contains a crosslinked polyvinyl acetal resin or comprises an intermolecularly crosslinked polyvinyl acetal resin.

In a further particular aspect of the thermoplastic resin sheet in accordance with the present invention, thickness (B)/thickness (A) is in the range of 0.5-10, wherein the thickness (B) is a thickness of the second polyvinyl acetal resin layer (B) and the thickness (A) is a thickness of the first second polyvinyl acetal resin layer (A).

In a further particular aspect of the thermoplastic resin sheet in accordance with the present invention, at least one polyvinyl acetal resin layer (B) is interposed between the polyvinyl acetal resin layers (A) having different thicknesses.

The laminate in accordance with the present invention includes at least one layer of the thermoplastic resin sheet constructed according to the present invention.

In a particular aspect of the laminate in accordance with the present invention, the thermoplastic resin sheet is securely interposed between a glass plate and a transparent resin plate.

In a further particular aspect of the laminate in accordance with the present invention, the transparent resin plate is composed of at least one selected from the group consisting of polycarbonates, acrylic resins, acrylic copolymer resins and polyesters.

In a further particular aspect of the laminate in accordance with the present invention, the transparent resin plate is coated with a transparent elastomer.

In a further particular aspect of the laminate in accordance with the present invention, the thermoplastic resin sheet is securely interposed between a pair of glass plates.

In a further particular aspect of the laminate in accordance with the present invention, at least one of the glass plates is a colored transparent glass plate.

In a further particular aspect of the laminate in accordance with the present invention, the laminate has a surface density of not higher than 12 kg/m$^2$.

The use of the thermoplastic resin sheet according to the first invention as an intermediate film of a laminated glass improves penetration resistance over a wide temperature range. This is because the inner layer of the thermoplastic resin sheet comprised of the second polyvinyl acetal resin layer (B) in which a polymer unit (X) and a polymer unit (Y), in total, account for at least 55% by mole while the first polymer unit (X) alone accounts for 0.5-80% by mole of the total of the coacetalized product, wherein the polymer unit (X) is an acetalized unit derived from the first aldehyde (a) and the polymer unit (Y) is an acetalized unit derived from the second aldehyde (b).

The use of the thermoplastic resin sheet according to the second invention as an intermediate film of a laminated glass improves penetration resistance over a wide temperature range, particularly from a low temperature region to an ordinary temperature region. This is because the inner layer of the thermoplastic resin sheet comprises the second polyvinyl acetal resin layer (B) in which a polymer unit (X) and a polymer unit (Y), in total, account for at least 55% by mole while the first polymer unit (X) alone accounts for 20-80% by mole of the total of the coacetalized product, wherein the polymer unit (X) is an acetalized unit derived from the first aldehyde (a) and the polymer unit (Y) is an acetalized unit derived from the second aldehyde (b).

The use of the thermoplastic resin sheet according to the third invention as an intermediate film of a laminated glass improves penetration resistance over a wide temperature range, particularly from an ordinary temperature region to a high temperature region. This is because the inner layer of the thermoplastic resin sheet comprises the second polyvinyl acetal resin layer (B) in which a polymer unit (X) and a polymer unit (Y), in total, account for at least 55% by mole while the first polymer unit (X) alone accounts for 0.5-20% by mole of the total of the coacetalized product, wherein the polymer unit (X) is an acetalized unit derived from the first aldehyde (a) and the polymer unit (Y) is an acetalized unit derived from the second aldehyde (b).

The use of the thermoplastic resin sheet according to the fourth invention as an intermediate film of a laminated glass improves penetration resistance over a wide temperature range, particularly from an ordinary temperature region to a high temperature region. This is because the inner layer of the thermoplastic resin sheet comprises the second polyvinyl acetal resin layer (B) in which an acetalized unit derived from the second aldehyde (b) accounts for at least 55% by mole of the total of the acetalized product.

That is, the temperature range over which penetration resistance is maximized can be controlled by adjusting the proportions of the polymer unit (X) and the polymer unit (Y), as described above. For example, it becomes possible to realize good penetration resistance in the higher temperature range by increasing a ratio by mole of the polymer unit (Y) to the polymer unit (X), i.e., polymer unit (Y)/polymer unit (X).

The allowable content of the plasticizer decreases as the ratio of the polymer unit (Y) to the polymer unit (X) increases. In the case where the plasticizer content in a polyvinyl acetal resin is remained the same, if the ratio of the polymer unit (Y) to the polymer unit (X) increases, the resulting polyvinyl acetal resin sheet becomes more rigid.

Thus, a performance of the resulting polyvinyl acetal resin sheet can be controlled by adjusting the proportions of the polymer unit (X) and the polymer unit (Y).

Preferably, the thermoplastic resin sheet has a certain degree of flexibility so that, in the fabrication of the laminate, it can follow various shapes of the glass plate and transparent resin plate which together constitute the laminate. For this purpose, the ratio of the polymer unit (Y) to the polymer unit (X) in the polyvinyl acetal resin sheet is preferably adjusted to fall within 200, more preferably within 3.5.

Because the thermoplastic resin sheet and the laminate in accordance with the present invention have the high-strength second polyvinyl acetal resin layer (B) as the inner layer, the resulting laminated glass even if using thin glasses assures an MBH of at least 4 m, when measured by a falling ball test according to JIS R 3212, over a very wide temperature range. This suggests that good impact resistance is assured even if the laminate glass is reduced in surface density and weight. That is, the present invention can achieve weight reduction of vehicles while assuring good impact resistance.

BRIEF DESCRIPTION OF THE DRAWINGS

[FIG. 1]

FIG. 1 is a schematic graph which explains the action of the thermoplastic resin sheet of the present invention.

BEST MODE FOR CARRYING OUT THE INVENTION

The present invention is below described in detail.
(First Polyvinyl Acetal Resin Layer (A))

In the thermoplastic resin sheet of the present invention, the first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms.

Examples of aldehydes having 4-6 carbon atoms include butyl aldehyde, isobutyl aldehyde and hexyl aldehyde. N-butyl aldehyde is particularly preferred.

The first polyvinyl acetal resin is obtained via acetalization of polyvinyl alcohol with at least one aldehyde (a) selected from these aldehydes.

The aforementioned polyvinyl alcohol or PVB preferably has an average degree of polymerization of 500-4,500, more preferably 1,000-2,500. If PVB has the average degree of polymerization of below 500, the resulting laminated glass may be reduced in penetration resistance. If it exceeds 3,000, the processability of PVB on an extruder decreases. In such a case, a strength of the intermediate layer may become too high to result in successful application to a safety glass.

The first polyvinyl acetal resin preferably has a degree of acetalization of 40-70% by mole. If the degree of acetalization is below 40% by mole, the resin becomes less compatible with the plasticizer which is then caused to bleed out. This may provide an adverse effect, e.g., deteriorate adherence between glasses and an intermediate layer comprising the thermoplastic resin sheet of the present invention. If the degree of acetalization exceeds 70% by mole, the intermediate layer may become too soft to exhibit sufficient penetration resistance.

The plasticizer can be chosen from conventionally-used ones without limitation. Examples of plasticizers include triethylene glycol di-2-ethyl butyrate (3GH), triethylene glycol di-2-ethyl hexanoate (3GO) and triethylene glycol di-2-caprinate. These maybe used alone or in combination. At least two first polyvinyl acetal resin layers (A) placed on opposite sides of the second polyvinyl acetal resin layer (B) may contain different types of plasticizers or the same type of plasticizer. The plasticizer content of the first polyvinyl acetal resin (A) is generally in the range of 10-50 parts by weight, preferably 30-45 parts by weight, more preferably 35-45 parts by weight, based on 100 parts by weight of the first polyvinyl acetal resin (A). If below 10 parts by weight, the amount of the plasticizer becomes excessively small. This may increase the difficulty of fabrication of an intermediate film, or render the intermediate film, if fabricated, less flexible and more rigid to considerably lower its handleability, or markedly reduce its penetration resistance at low temperatures. If above 50 parts by weight, the penetration resistance of the resulting intermediate film may decrease, or bleedout of the plasticizer may occur to mar an appearance of the intermediate layer badly.

(Second Polyvinyl Acetal Resin Layer (B))

In the first through third inventions, the second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-6 carbon atoms and at least one aldehyde (b) selected from the group consisting of aldehydes having 1-3 carbon atoms.

In the fourth invention, the second polyvinyl acetal resin layer (B) contains a plasticizer and a second polyvinyl acetal resin in the form of an acetalized product obtained via acetalization of polyvinyl alcohol with at least one aldehyde (b) selected from the group consisting of aldehydes having 1-3 carbon atoms.

Those aldehydes (a) listed above as being useful in obtaining the first polyvinyl acetal resin can also be used here.

Examples of useful aldehydes (b) include those having 1-3 carbon atoms, such as formaldehyde, acetaldehyde and propionaldehyde. Such aldehydes (b) may be used alone or in combination.

In the second polyvinyl acetal resin layer (B) obtained via coacetalization of polyvinyl alcohol with the aldehydes (a) and (b), the plasticizer becomes less compatible and may cause a problematic bleedout, if the total amount of a polymer unit (X) and a polymer unit (Y) decreases, wherein the polymer unit (X) is an acetalized unit derived from the first aldehyde (a) and the polymer unit (Y) is an acetalized unit derived from the second aldehyde (b). Accordingly, the total amount thereof is kept to account for at least 55% by mole of the total of the coacetalized product.

Also in the second polyvinyl acetal resin layer (B) obtained via acetalization of polyvinyl alcohol with the aldehyde (b) alone, the plasticizer becomes less compatible and may cause a problematic bleedout, if the degree of acetalization decreases. Accordingly, the degree of acetalization is kept to account for at least 55% by mole of the total of the acetalized product.

The ratio of the polymer unit (Y) to the polymer unit (X) is adjusted so that the resulting final structure exhibits a maximum performance in penetration resistance in the desired temperature range. When sufficient penetration resistance is needed over a range from an ordinary temperature region to a high temperature region, the ratio by mole of the polymer unit (Y) to the polymer unit (X), i.e., polymer unit (Y)/polymer unit (X), in the second polyvinyl acetal resin layer (B) may preferably be increased. Alternatively, only the polymer unit (Y) may constitute the second polyvinyl acetal resin layer (B). More preferably, when the polymer unit (X) and the polymer unit (Y) together constitute the second polyvinyl acetal resin layer (B), the ratio of the polymer unit (Y) to the polymer unit (X) in the polyvinyl acetal resin layer (B) is kept within 200.

On the other hand, when sufficient penetration resistance is needed over a range from a low temperature region to an ordinary temperature region, the ratio by mole of the polymer unit (Y) to the polymer unit (X), i.e., polymer unit (Y)/polymer unit (X), in the second polyvinyl acetal resin layer (B) may preferably be reduced. More preferably, it is kept within 3.5.

Polyvinyl alcohol used to obtain the second polyvinyl alcohol may have an average degree of polymerization that is comparable to that of polyvinyl alcohol used in obtaining the first polyvinyl acetal resin. However, polyvinyl alcohol having an average degree of polymerization of 1,700-2,500 is preferred for use as a raw material because the second polyvinyl acetal resin (B) constitutes an inner layer in case where the thermoplastic resin sheet is used as an intermediate film. If the degree of polymerization is below 1,700, the resulting polyvinyl acetal resin may not exhibit sufficient penetration resistance. If above 3,000, the resulting resin increases in viscosity and in some cases exhibits poor processability on an extruder.

Those plasticizers listed above as being incorporated in the first polyvinyl acetal resin layer (A) are also useful for incorporation in the second polyvinyl acetal resin layer (B). The first polyvinyl acetal resin layer (A) and second polyvinyl acetal resin layer (B) may contain the same type of plasticizer or different types of plasticizers.

The plasticizer content of the second polyvinyl acetal resin layer (B) is generally in the range of 10-40 parts by weight, preferably 20-35 parts by weight, more preferably 25-35 parts by weight, based on 100 parts by weight of the second polyvinyl acetal resin. If below 10 parts by weight, the amount of the plasticizer becomes excessively small. This may increase the difficulty of fabrication of an intermediate film, or render the intermediate film, if fabricated, less flexible and more rigid to considerably lower its handleability, or markedly reduce its penetration resistance at low temperatures. If above 50 parts by weight, the penetration resistance of the resulting intermediate film may decrease, or bleedout of the plasticizer may occur to mar an appearance of the intermediate layer badly.

(Laminate Configuration)

The laminate configuration of the thermoplastic resin sheet according to the present invention is not particularly specified, so long as the first polyvinyl acetal resin layers (A) are placed on opposite sides of the at least one second polyvinyl acetal resin layer (B). Where the thermoplastic resin sheet of the present invention is used as an intermediate film of a glass laminate, preferred laminate configurations are illustrated by a) a three-layer laminate film of (A)/(B)/(A) and b) a five-layer laminate film of (A)/(B)/(A)/(B)/(A). In the case where the laminate film consists of three or more layers, the laminate configuration may be unsymmetrical, so long as the layer (A) constitutes at least one of surface layers.

The reason for which the three-layer laminate film of (A)/(B)/(A) is preferred is due to a relative relationship in dynamic modulus of the layers (A) and (B). In addition, the resulting intermediate film provides good workability in a lamination process, as similar to a general PVB-based intermediate film.

In the laminate in accordance with the present invention, the above-described thermoplastic resin sheet serves as an intermediate film placed between first and second transparent plates which comprise a glass or transparent resin.

(Reason Why the Thermoplastic Resin Sheet of the Present Invention Improves Penetration Resistance)

FIG. 1 is a schematic graph which explains the action of the thermoplastic resin sheet of the present invention. The abscissa axis represents a temperature while the ordinate axis represents the penetration resistance of the laminated glass made using the thermoplastic resin sheet.

In FIG. 1, a solid line A shows a result for a laminated glass using a thermoplastic resin sheet, as an intermediate film, which comprises a PVB single layer obtained via acetalization of polyvinyl alcohol using butyraldehyde alone. A broken line B shows an exemplary penetration resistance for a laminated glass in which an inner layer portion of a structure comprised of the aforementioned PVB single layer sheet was replaced with a PVB layer made relatively harder by reducing its plasticizer content, as described in Patent Literatures 1 and 2. As apparent from the comparison between the solid line A and the broken line B, the provision of the inner layer comprising the PVB layer having a lower plasticizer content increases a maximum value of penetration resistance. However, the temperature dependence of penetration resistance shifts toward a higher temperature region. As a result, the penetration resistance improves at high temperatures but drastically drops at low temperatures.

On the other hand, the use of the thermoplastic resin sheet of the present invention not only increases a maximum penetration resistance but also enables the laminated glass to exhibit good penetration resistance over a wide temperature range, as shown in a solid line C. This is because a polyvinyl acetal resin either in the form of the coacetalized product containing certain proportions of the polymer units (X) and (Y) or in the form of the acetalized product containing the polymer unit (Y) alone is used to constitute the inner layer. The aldehyde (a) has a large molecular structure and when acetalized provides greater steric hindrance, and accordingly its use results in the production of a flexible acetal resin. However, the present invention uses the aldehyde (b) which is less sterically hindering than the aldehyde (a). It is believed that this shortens a distance between molecules and strengthens an intermolecular force so that the resulting resin exhibits the improved rigidity compared to the acetal resin produced using the aldehyde (a) alone. Also because the polyvinyl acetal resin (B) has features as described above, in the case where the molar ratio of the polymer unit (Y) to the polymer unit (X) in the polyvinyl acetal resin (B), i.e., polymer unit (Y)/polymer unit (X), is small, the polyvinyl acetal resin layer (B) despite of its higher plasticizer content can be rendered more rigid than the polyvinyl acetal resin (A). Also because the polyvinyl acetal resin can increase its plasticizer content without a loss of rigidity, improved impact resistance can be achieved over a wide temperature range, especially over a range from a low temperature region to an ordinary temperature region, which the conventional PVB resin never accomplished.

If the molar ratio of the polymer unit (Y) to the polymer unit (X) in the polyvinyl acetal resin (B), i.e., polymer unit (Y)/polymer unit (X), is large, or if the polymer unit (X) is excluded, the polyvinyl acetal resin (B) becomes further rigid so that the penetration resistance can be improved. Also in this case, the thermoplastic resin sheet made by interposing the polyvinyl acetal resin layer (B) between the polyvinyl acetal resin layers (A) can achieve good impact resistance in all temperature regions, although better in the ordinary and high temperature regions, which the conventional PVB resin never accomplished.

That is, the inventors of the present application have discovered experimentally that the use of the first polyvinyl acetal resin layer (A) as the outer layer, as well as the second polyvinyl acetal resin layer (B) as the inner layer which either comprises the coacetalized product containing the polymer unit (X) and polymer unit (Y) in the above-specified proportions or comprises the acetalized product containing the polymer unit (Y) alone, improves the penetration resistance over a wide temperature range.

They also have confirmed through experiments that when weight reduction of an automobile was contemplated by using the conventional thermoplastic resin sheet as an intermediate film and reducing the thickness of glass plates so that the resulting laminated glass has a surface density of not exceeding 12 kg/m$^2$, the laminated glass shows the reduced impact resistance and the narrowed temperature range over which an MBH of at least 4 m is attained on a falling ball test according to JIS R 3212.

On the other hand, a laminated glass having a surface density of not exceeding 12 kg/m$^2$, when fabricated using the thermoplastic resin sheet in accordance with this invention, shows an MBH of at least 4 m in the 0° C.-40° C. temperature range and realizes an MBH of at least 4 m over a very wide temperature range on a falling ball test according to JIS R 3212, despite of its low surface density. This is because the thermoplastic resin sheet of the present invention has sufficient rigidity. This means that the thermoplastic resin sheet has sufficient impact resistance, even if the glass laminate is reduced both in surface density and weight. That is, this demonstrates the simultaneous accomplishment of weight reduction of vehicles and impact resistance.

PREFERRED EMBODIMENTS

The thermoplastic resin sheet of the present invention insures impact resistance in all temperature regions, which the conventional PVB resins have failed. If the penetration resistance from an ordinary to high temperature region is of concern, the second polyvinyl acetal resin layer (B) preferably comprises the polymer unit (Y) alone. Alternatively, in the case where the second polyvinyl acetal resin layer (B) comprises the coacetalized product, the molar ratio of the polymer unit (Y) to the polymer unit (X), i.e., polymer unit (Y)/polymer unit (X), is preferably kept within 200.

If the penetration resistance from a low to ordinary temperature region is of concern, in the case where the second polyvinyl acetal resin layer (B) comprises the coacetalized product, the molar ratio of the polymer unit (Y) to the polymer unit (X), i.e., polymer unit (Y)/polymer unit (X), is preferably kept within 3.5. With the molar ratio being kept within 3.5, the improved penetration resistance is assured over the wider temperature range. Preferably, the molar ratio is 1.0-2.0.

The improved penetration resistance over the similarly wide temperature range can also be obtained when the temperature t(A) at which a loss tangent tan δ measured at a frequency of 10 Hz for a sheet comprised solely of the polyvinyl acetal resin layer (A) shows a maximum value is in the range of 20-50° C., the temperature t(B) at which a loss tangent tan δ for a sheet comprised of the second polyvinyl acetal resin layer (B) shows a maximum value is in the range of 35-70° C., and t(B)-t(A) is between 5° C. and 40° C. More preferably, the temperature t(B) at which a loss tangent tan δ for a sheet comprised of the second polyvinyl acetal resin layer (B) shows a maximum value is in the range of 40-65° C. and t(B)-t(A) is between 5° C. and 25° C.

In the case where the surface resin layer has a Tg of 32-35° C. and the inner resin layer has a Tg of 35-60° C., as described in Patent Literature 2, if a difference in Tg between them is small, the thermoplastic resin sheet as a whole gives a one-peak characteristic curve on the DSC chart. This may result in the failure to obtain improved penetration resistance over a wide temperature range, when it is measured by a falling ball test. If the difference in Tg between them is excessively large, the thermoplastic resin sheet as a whole gives a two-peak characteristic curve on the DSC chart. In this case, the resin sheet may fail to cover the practical temperature region for a laminated glass and lose its practical usefulness.

In contrast, the improved penetration resistance can be obtained over an entire temperature range in practical use of 0-40° C., if the difference between a temperature at which a loss tangent for the second polyvinyl acetal resin layer (B) shows a maximum point and a temperature at which a loss tangent for the first polyvinyl acetal resin layer (A) shows a maximum point is kept within the above-specified range.

Also in the thermoplastic resin sheet of the present invention, there exists an overlapping temperature region between a temperature range in which a loss tangent tan δ for a sheet comprised of the first polyvinyl acetal resin layer (A) is at least 0.3 and a temperature range in which a loss tangent tan δ for a sheet comprised of the second polyvinyl acetal resin layer (B) is at least 0.3. That is, the temperature region in which a loss tangent is at least 0.3 is designed to lie upon the both ranges for the two types of polyvinyl acetal resin layers. Thus, the overlapping temperature region in which a loss tangent, contributory to energy dissipation, is at least 0.3 extends, for example, over the practical use temperature range of 0-40° C. This lessens the temperature dependence of penetration resistance. As a result, the improved penetration resistance can be obtained over a wide temperature range. Since the loss tangent contributes to energy dissipation, it is more preferred that there exists an overlapping temperature region between a temperature range in which a loss tangent tan δ for a sheet comprised of the first polyvinyl acetal resin layer (A) is at least 0.5 and a temperature range in which a loss tangent tan δ for a sheet comprised of the second polyvinyl acetal resin layer (B) is at least 0.5.

Also, G' (B)/G' (A) is preferably in the range of 1.0-10, wherein G' (A) is a shear storage modulus at 23° C. at 10 Hz of the first polyvinyl acetal resin layer (A) and G' (B) is a shear storage modulus at 23° C. at 10 Hz of the second polyvinyl acetal resin layer (B). This case also results in obtaining further improved penetration resistance.

Also in the thermoplastic resin sheet of the present invention, a ratio in tear strength of the second polyvinyl acetal resin layer (B) to the first polyvinyl acetal resin layer (A), i.e., tear strength (B)/tear strength (A), is preferably at least 1.1 when measured according to JIS K 7128. The higher tear strength (B) of the second polyvinyl acetal resin layer (B) constituting the inner layer, as specified above, enables effective improvement of penetration resistance itself.

Also preferably, tensile modulus (B)/tensile modulus (A) is at least 1.1, wherein the tensile modulus (B) is a tensile modulus of the second polyvinyl acetal resin layer (B) when measured at 23° C. at a tensile strain rate of 1,250%/min and the tensile modulus (A) is a tensile modulus of the first polyvinyl acetal resin layer (A). The higher tensile modulus at 23° C. of the second polyvinyl acetal resin layer (B), as specified above, enables further improvement of penetration resistance at ordinary temperature. More preferably, tensile modulus (B)/tensile modulus (A) is at least 10.

In the thermoplastic resin sheet in accordance with the present invention, breaking energy (B)/breaking energy (A) is preferably at least 1.1, wherein the breaking energy (B) is a breaking energy of the second polyvinyl acetal resin layer (B) when measured at 23° C. at a tensile strain rate of 1,250%/min and the breaking energy (A) is a breaking energy of the first polyvinyl acetal resin layer (A). Also preferably, maximum point stress (B)/maximum point stress (A) is at least 1.0, wherein the maximum point stress (B) is a maximum point stress of the second polyvinyl acetal resin layer (B) when measured at 23° C. at a tensile strain rate of 1,250%/min and the maximum point stress (A) is a maximum point stress of the first polyvinyl acetal resin layer (A).

If the second polyvinyl acetal resin layer (B) is designed to exhibit at least 1.1 times the breaking energy of the first polyvinyl acetal resin layer (A) and at least 1.0 time the maximum point stress of the first polyvinyl acetal resin layer (A), as described above, the penetration resistance improving effect of the second polyvinyl acetal resin layer (B) can be furthered.

Also in the thermoplastic resin sheet in accordance with the present invention, PVA polymerization degree (B)/PVA polymerization degree (A) is within the range of 0.5-3.0, more preferably within the range of 1.0-3.0, wherein the PVA polymerization degree (B) is a degree of polymerization of polyvinyl alcohol for constituting the second polyvinyl acetal resin layer (B) and the PVA polymerization degree (A) is a degree of polymerization of polyvinyl alcohol for constituting the first polyvinyl acetal resin layer (A). The higher degree of polymerization of polyvinyl alcohol for use in the second polyvinyl acetal resin layer (B) serving as the inner layer improves tensile properties at ordinary temperature, thereby resulting in effective improvement of penetration resistance. It is accordingly desirable that PVA polymerization degree (B)/PVA polymerization degree (A) is at least 0.5. However, if the ratio exceeds 3.0, the excessively high polymerization degree of polyvinyl acetal resin (B) may reduce processability on an extruder.

The ester group content of the coacetalized product constituting the second polyvinyl acetal resin layer (B) is preferably within 40% by mole, more preferably within 20% by mole. If the ester group content by mole is reduced to 20% or less, a lipophic nature increases to thereby allow a higher plasticizer content. Therefore, penetration resistance can be further improved. If above 40% by mole, the intermediate film becomes too soft to insure sufficient penetration resistance. More preferably, the ester group content is within 15% by mole.

In the thermoplastic resin sheet in accordance with the present invention, plasticizer content (A)/plasticizer content (B) is preferably within the range of 1.0-3, wherein the plasticizer content (A) is a plasticizer content of the first polyvinyl acetal resin layer (A) and the plasticizer content (B) is a plasticizer content of the second polyvinyl acetal resin layer (B). Plasticizer content (A)/plasticizer content (B), if kept within the range of 1.0-3, renders the second polyvinyl acetal resin layer (B) relatively harder, so that penetration resistance can be further improved. More preferably, it is 1.0-2.0. If this plasticizer content ratio is below 1.0, the second polyvinyl acetal resin layer (B) becomes relatively softer, possibly resulting in the failure to improve penetration resistance. If above 3, the first polyvinyl acetal resin layer (A) may become excessively soft to increase the difficulty of processability, or the second polyvinyl acetal resin layer (B) may become excessively hard to impair flexibility.

In the present invention, the polyvinyl acetal resin layer (A) and/or (B) preferably contains functional fine particles. The type of such functional fine particle is not particularly specified. Fine particles such as of ITO or $LaB_6$ can be suitably used which has a middle-infrared or near-infrared absorbing function. Inclusion of such fine particles impart a heat-shielding function to the thermoplastic resin sheet. Since the thermoplastic resin sheet is able to absorb a near-infrared or middle-infrared radiation even at a low ambient temperature in the winter season, a laminated glass using such a thermoplastic resin sheet can be readily maintained at a temperature of 0° C. or above. The reduction of penetration resistance at ordinary temperature can also be prevented.

In the thermoplastic resin sheet in accordance with the present invention, the first polyvinyl acetal resin layer (A) and/or the second polyvinyl acetal resin layer (B) preferably contains a crosslinked polyvinyl butyral resin. Also, the first polyvinyl acetal resin layer (A) and/or the second polyvinyl acetal resin layer (B) may comprise at least one layer of an intermolecularly crosslinked polyvinyl acetal resin. Inclusion of the crosslinked polyvinyl butyral resin and lamination of the crosslinked polyvinyl acetal resin further improves penetration resistance. According to one method of crosslinking a polyvinyl acetal resin, dialdehyde such as glutaraldehyde is used to lightly crosslink molecules in the form of diacetal bond while polyvinyl alcohol is acetalized with butyraldehyde or other aldehyde. According to another method, polyvinyl acetal molecules are crosslinked in the form of monobutyral bond by adding an acid catalyst, after at least 90% of a target degree of acetalization is reached during an acetalization reaction of polyvinyl alcohol, and allowing a reaction to continue at 60-95° C. A further method involves adding a crosslinking agent to thereby form crosslink bonds between hydroxyl groups remaining in the obtained polyvinyl acetal resin. Examples of crosslinking agents reactive with hydroxyl groups include epoxy compounds, isocyanate compounds and boric compounds.

(Other Components that can be Incorporated in the Polyvinyl Acetal Resin Layer (A) or (B))

Other components, such as metal carboxylates and modified silicone oils, can be added to the polyvinyl acetal resin layer (A) and/or (B) for the purpose of controlling adhesion of an intermediate film to a glass.

In a further particular aspect of the laminate according to the present invention, a control is provided so that an adhesive force P between the polyvinyl acetal resin layer (A) and a first transparent plate differs from an adhesive force Q between the polyvinyl acetal resin layer (A) and a second transparent plate.

Various methods can be utilized to control adhesion. A hydroxyl content of the polyvinyl acetal resin layer (A) may be lowered. The types of additives such as metal carboxylates and modified silicone oils maybe altered. The loadings of such additives may be varied. The glass may be treated at its surface with a silane coupling agent to improve its adherence. The most easiest in practice, among those methods, is to vary the loadings of additives such as metal carboxylates and modified silicone oils.

Examples of preferred metal carboxylates include alkali metal or alkaline-earth metal salts of aliphatic monocarboxylic or dicarboxylic acid having 12 or less carbon atoms. Examples of metal components include Mg, Na and K. Examples of carboxylic acids include acetic acid, propionic acid, butyric acid, caproic acid and capric acid. Examples of preferred metal carboxylates include potassium acetate, magnesium acetate, potassium propionate and magnesium propionate. Particularly preferred among them are potassium acetate and magnesium acetate.

Examples of modified silicone oils include ether-modified silicone oils, epoxy-modified silicone oils, ester-modified silicone oils, amine-modified silicone oils and alkali-modified silicone oils. These take the form of viscous liquid and can be obtained generally by reacting polysiloxane with a compound to be modified.

When necessary, conventionally-known UV absorbers, antioxidants, pigments and dyes may be added as constituents of the thermoplastic resin sheet.

The thickness of the thermoplastic resin sheet in accordance with the present invention is not particularly specified. However, in the case where the thermoplastic resin sheet is used as an intermediate film of a laminated glass, its thickness is preferably 0.3-1.6 mm. The larger thickness improves penetration resistance. However, in view of a minimum penetration resistance required for the laminated glass, the above-specified range is preferred.

The aforementioned layer (A) may have a single-layer or multilayer construction. If its thickness decreases, a marked reduction of penetration resistance may result. Thus, it preferably has a thickness of at least 0.1 mm. The thickness of the layer (B) preferably occupies at least 10% of the total thickness of an intermediate film. If its thickness is below 10% of the total thickness of the thermoplastic resin sheet, sufficient penetration resistance may not be obtained.

Preferred Embodiments

In a preferred embodiment of a laminate as provided by the first invention, a thermoplastic resin sheet is interposed, as an intermediate film, between first and second transparent plates. Characteristically, the thermoplastic resin sheet has a laminated structure including a first polyvinyl acetal resin layer (A) and a second polyvinyl acetal resin layer (B). The first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms. The second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-6 carbon atoms and at least one aldehyde (b) selected from the group consisting of aldehydes having 1-3 carbon atoms. The thermoplastic resin sheet has such a structure that the first polyvinyl acetal resin layer (A) is provided on each side of at least one second polyvinyl acetal resin layer (B). In the second polyvinyl acetal resin layer (B), a polymer unit (X) and a polymer unit (Y), in total, account for at least 55% by mole while the first polymer unit (X) alone accounts for 0.5-80% by mole of the total of the coacetalized product, wherein the polymer unit (X) is an acetalized unit derived from the first aldehyde (a) and the polymer unit (Y) is an acetalized unit derived from the second aldehyde (b). When the thermoplastic resin sheet is adhered to the same type of transparent plates, an adhesive force P between the polyvinyl acetal resin sheet (A) and the first transparent sheet is rendered different from an adhesive force Q between the polyvinyl acetal resin sheet (B) and the second transparent sheet.

In a further preferred embodiment of a laminate in accordance with the second invention, a thermoplastic resin sheet is interposed as an intermediate film between first and second transparent plates. Characteristically, the thermoplastic resin sheet has a laminated structure including a first polyvinyl acetal resin layer (A) and a second polyvinyl acetal resin layer (B). The first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms. The second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-6 carbon atoms and at least one aldehyde (b) selected from the group consisting of aldehydes having 1-3 carbon atoms. The thermoplastic resin sheet has such a structure that the first polyvinyl acetal resin layer (A) is provided on each side of at least one second polyvinyl acetal resin layer (B). In the second polyvinyl acetal resin layer (B), a polymer unit (X) and a polymer unit (Y), in total, account for at least 55% by mole while the first polymer unit (X) alone accounts for 20-80% by mole of the total of the coacetalized product, wherein the polymer unit (X) is an acetalized unit derived from the first aldehyde (a) and the polymer unit (Y) is an acetalized unit derived from the second aldehyde (b). When the thermoplastic resin sheet is adhered to the same type of transparent plates, an adhesive force P between the polyvinyl acetal resin sheet (A) and the first transparent sheet is rendered different from an adhesive force Q between the polyvinyl acetal resin sheet (B) and the second transparent sheet.

In a further preferred embodiment of a laminate in accordance with the third invention, a thermoplastic resin sheet is interposed as an intermediate film between first and second transparent plates. Characteristically, the thermoplastic resin sheet has a laminated structure including a first polyvinyl acetal resin layer (A) and a second polyvinyl acetal resin layer (B). The first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms. The second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-6 carbon atoms and at least one aldehyde (b) selected from the group consisting of aldehydes having 1-3 carbon atoms. The thermoplastic resin sheet has such a structure that the first polyvinyl acetal resin layer (A) is provided on each side of at least one second polyvinyl acetal resin layer (B). In the second polyvinyl acetal resin layer (B), a polymer unit (X) and a polymer unit (Y), in total, account for at least 55% by mole while the first polymer unit (X) alone accounts for 0.5-20% by mole of the total of the coacetalized product, wherein the polymer unit (X) is an acetalized unit derived from the first aldehyde (a) and the polymer unit (Y) is an acetalized unit derived from the second aldehyde (b). When the thermoplastic resin sheet is adhered to the same type of transparent plates, an adhesive force P between the polyvinyl acetal resin sheet (A) and the first transparent sheet is rendered different from an adhesive force Q between the polyvinyl acetal resin sheet (B) and the second transparent sheet.

In a further preferred embodiment of a laminate in accordance with the fourth invention, a thermoplastic resin sheet is interposed as an intermediate film between first and second transparent plates. Characteristically, the thermoplastic resin sheet has a laminated structure including a first polyvinyl acetal resin layer (A) and a second polyvinyl acetal resin layer (B). The first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms. The second polyvinyl acetal resin layer (B) contains a plasticizer and a second polyvinyl acetal resin obtained via acetalization of polyvinyl alcohol with at least one aldehyde (b) selected from the group consisting of aldehydes having 1-3 carbon atoms. The thermoplastic resin sheet has such a structure that the first polyvinyl acetal resin layer (A) is provided on each side of at least one second polyvinyl acetal resin layer (B). The second polyvinyl acetal resin layer (B) has a degree of acetalization of at least 55 mole %. When the thermoplastic resin sheet is adhered to the same type of transparent plates, an adhesive force P between the polyvinyl acetal resin sheet (A) and the first transparent sheet is rendered different from an adhesive force Q between the polyvinyl acetal resin sheet (B) and the second transparent sheet.

In the aforesaid laminates, at least one of the first and second transparent plates may comprise a glass plate.

In another aspect of the aforesaid laminates, at least one of the first and second transparent plates comprises a transparent resin plate.

In a further aspect of the aforesaid laminates, the transparent resin plate is composed of at least one selected from the group consisting of polycarbonates, acrylic resins, acrylic copolymer resins and polyesters.

In a further aspect of the aforesaid laminates, the transparent resin plate is covered with a transparent elastomer.

In a further aspect of the aforesaid laminates, the first and second transparent plates are glass plates.

In a further aspect of the aforesaid laminates, at least one glass plate is a colored transparent glass.

In a further aspect of the aforesaid laminates, a surface density does not exceed 12 kg/m².

When the aforesaid laminates are used to close openings in architectural structures or vehicles, a side of each laminate that has the adhesive force P or Q, whichever is higher, is preferably positioned to face toward an inside of the architectural structure or vehicle.

Each of the laminates described in the section of preferred embodiment shows improved penetration resistance over a wide temperature range, due to the incorporation of the second polyvinyl acetal resin layer (B) in the thermoplastic resin sheet. Also, in the case where the thermoplastic resin sheet is adhered to the same type of transparent plates, an adhesive force P between the polyvinyl acetal resin sheet (A) and the first transparent sheet is rendered different from an adhesive force Q between the polyvinyl acetal resin sheet (B) and the second transparent sheet. Because of such a design, an impact energy can be absorbed sufficiently between the low-adhesion transparent plate and the thermoplastic resin sheet. Therefore, the transparent plate laminate exhibits the improved penetration resistance against an impact from the low-adhesion side. In addition, when the transparent plate laminate is broken, broken fragments of the high-adhesion first or second transparent plate are hard to separate from the thermoplastic resin sheet.

When a transparent plate laminate such as having a thermoplastic resin sheet interposed between a pair of glasses is broken, broken glass fragments may scatter. In order to reduce the occurrence of such scattering, an adhesive force between the glasses and the thermoplastic resin sheet may be increased. However, simple increasing of the adhesive force between the glasses and the thermoplastic resin sheet does not suffice the level of penetration resistance required for a laminated glass and fails to provide the required performance. Thus, in the laminate of the second invention, the polymer units (X) and (Y) in the above-specified proportion are incorporated in the second polyvinyl acetal resin layer (B) to thereby insure sufficient penetration resistance. Also, the adhesive forces P and Q are rendered different from each other, as described above. This insures sufficient impact energy absorbency on the low-adhesion side and reduce the occurrence of scattering of a glass, if broken into fragments, on the high-adhesion side.

When the transparent plate laminate is used to close openings in architectural structures or vehicles, a side of the laminate that has the adhesive force P or Q, whichever is higher, may preferably be located to face toward an inside of the architectural structure or vehicle. This insures safety of persons in the architectural structure or passengers in the vehicle. Further, because of the ability to absorb more impact energy on its side toward an outside of the architectural structure or vehicle, the transparent plate laminate exhibits the increased penetration resistance against an impact from the outside of the architectural structure or vehicle. Also, with the side of the laminate that has the adhesive force P or Q, whichever is higher, being located to face toward an inside of the architectural structure or vehicle, the first and second transparent plates, if broken into fragments, are effectively prevented from scattering toward an inside of the architectural structure or vehicle. Therefore, persons in the architectural structure or passengers in the vehicle are prevented from being seriously injured by scattered glass fragments.

Various methods conventionally known in the art can be utilized to prepare the thermoplastic resin sheet of the present invention. For example, respective films constituting the polyvinyl acetal resin layers (A) and (B) are separately formed. Alternatively, the polyvinyl acetal resin layers (A) and (B) may be integrally formed using a multilayer extruder. When a method is utilized in which the polyvinyl acetal resin layers (A) and (B) are laminated during fabrication of a laminated glass, they may preferably be integrally formed by a multilayer extruder. If the other method is utilized, the following problems arise. Lamination of plural glass sheets renders the method less workable. Also, a low smoothness of an interface between the polyvinyl acetal resin layers (A) and (B) causes an optical strain which produces a strained image when viewed through the resulting laminated glass.

Methods conventionally used in the art can be utilized to fabricate a laminated glass including the thermoplastic resin sheet of the present invention. For example, a method may be utilized in which an intermediate film is interposed between glass plates and then the combination is heat pressed to fabricate a laminated glass.

Where the laminate of the present invention is a laminated glass, at least one of glass plates constituting the laminated glass may preferably be a colored transparent glass. A green soda-lime silica glass is generally used as the colored transparent glass. The colored transparent glass absorbs a visible light in a certain wavelength range and reduces a chance of a sunlight to cause a skin irritation and thus a discomfort to a passenger in a vehicle.

The use of the thermoplastic resin sheet of the present invention as an intermediate film is not limited to a laminated glass. In accordance with the present invention, laminates having the thermoplastic resin sheet as at least one layer, as appropriate for uses, can be provided. In these cases, the thermoplastic resin sheet provides sufficient penetration resistance to such laminates.

The laminate in accordance with the present invention may take various configurations. The thermoplastic resin sheet may be securely interposed between a glass plate and a transparent resin plate or between a pair of transparent resin plates or between a pair of glass plates, for example.

The surface density of the laminate in accordance with the present invention is not particularly specified but may preferably be rendered low, considering that a reduction in weight of a laminated glass lightens a weight of a vehicle and accordingly improves its gas mileage. Preferably, it does not exceed 12 kg/m$^2$.

The transparent resin plate is not particularly specified in type but preferably comprises at least one selected from the group consisting of polycarbonates, acrylic resins, acrylic copolymer resins and polyesters. The transparent resin plate may be coated with a transparent elastomer.

In the present invention, when the laminate is used to close openings in architectural structures or vehicles, a side of the laminate that has the adhesive force P or Q, whichever is higher, is preferably positioned to face toward an inside of the architectural structure or vehicle. Such positioning increases penetration resistance of the transparent plate laminate against an impact from an outside of the architectural structure or vehicle. Also, the ability of the laminate to absorb more impact energy on its side toward an outside of the architectural structure or vehicle insures safety of persons in the architectural structure or passengers in the vehicle. Further, in case the laminate is broken, fragments of the first and second transparent plates separated from the thermoplastic resin sheet can be prevented from scattering toward an inside of the architectural structure or vehicle.

The present invention is now described in more detail by referring to specific examples and comparative examples. The following examples are not intended to limit the present invention.

EXAMPLE 1

100 parts by weight of PVB (average polymerization degree of 1,700, butyralization degree of 68.5 mole %, acetyl residue of 0.7 mole %) obtained via acetalization of polyvinyl alcohol having a polymerization degree of 1,700 with butyraldehyde and 40 parts by weight of triethylene glycol di-2-ethylhexanoate (3GO) as a plasticizer were mixed. As an adhesion control agent, a magnesium acetate/magnesium 2-ethyl butyrate mixture was subsequently added so that magnesium amounted 50 ppm with respect to the total amount of the resin composition. As a result, a first resin useful for formation of the first polyvinyl acetal resin layer (A) was prepared.

Separately, 100 parts by weight of a coacetalized polyvinyl acetal resin (average degree of polymerization of 2,000, total degree of acetalization of 69.5 mole %, acetyl residue of 1.3 mole %, degree of acetalization by acetaldehyde of 37.8 mole %, degree of acetalization by butyraldehyde of 31.8 mole %) obtained via coacetalization of polyvinyl alcohol having a degree of polymerization of 2,000 with acetaldehyde and buryraldehyde and 25 parts by weight of triethylene glycol di-2-ethylhexanoate (3GO), as a plasticizer, were mixed to prepare a resin useful for the second polyvinyl acetal resin layer (B).

The first and second resins were fed in a multilayer extruder and then integrally formed to obtain a 0.75 mm thick, three-layer thermoplastic resin sheet consisting of a first outer layer (first polyvinyl acetal resin layer (A))/an inner layer (second polyvinyl acetal resin layer (B))/a second outer layer (first polyvinyl acetal resin layer (A)).

The three-layer thermoplastic resin sheet, as obtained above, was interposed between 2.5 mm thick float glasses. The assembly was provisionally press bonded between nip rolls and then introduced into an autoclave where it was treated at 140° C. at 13 atmospheric pressures to complete a laminated glass structure. The laminated glass, as completed, had a surface density of 13.3 kg/m$^2$.

Also, the resin for use in the first polyvinyl acetal resin layer (A) was formed into a 0.93 mm thick sheet. This sheet was evaluated for shear storage modulus G' at 23° C., loss tangent at 23° C., maximum value of loss tangent, loss tangent peak temperature, temperature region in which a loss tangent is at least 0.5 and temperature region in which a loss tangent is at least 0.3. Similarly, the tear strength (A), breaking energy (A), maximum point stress (A) and tensile modulus (A) of the sheet were evaluated according to the below-described procedures.

Separately, the resin for use in the second polyvinyl acetal resin layer (B) was formed into a 1.02 mm thick sheet. Similarly, this sheet was measured for shear storage modulus G' at 23° C., loss tangent at 23° C., maximum value of loss tangent, loss tangent peak temperature, temperature region in which a loss tangent is at least 0.5 and temperature region in which a loss tangent is at least 0.3, and also determined for tear strength (B), breaking energy (B), maximum point stress (B) and tensile modulus (B).

(a) Measurement of shear storage modulus G' at 23° C.

(b) Measurement of loss tangent at 23° C., loss tangent peak temperature, temperature region in which a loss tangent is at least 0.5 and temperature region in which a loss tangent is at least 0.3

A dynamic viscoelasticity tester was utilized to apply to each sheet a shear strain at a set strain of 0.08% at a measurement frequency of 10 Hz. While the temperature was varied at a rate of 3° C./min from −50° C. to 150° C., a shear storage modulus at each temperature was measured. The value measured at 23° C. was designated as a shear storage modulus G' at 23° C. Concurrently, the values for loss tangent at each temperature were measured to determine a loss tangent peak temperature, a temperature region in which a loss tangent is at least 0.5 and a temperature region in which a loss tangent is at least 0.3.

(c) Tear strength

Each sheet was pulled at a rate of 500 mm/min to measure a tear strength according to the method specified in JIS K 7128.

(d) Breaking energy
(e) Maximum point stress
(f) Tensile strength

A 10 mm wide and 8 cm long test piece was cut out from the thermoplastic resin sheet. The test piece was attached to a tensile tester with a 40 mm spacing between chucks, and pulled at a rate of 500 mm/min (tensile strain rate of 1,250%/min). A stress-strain curve was obtained from this tensile test to determine the breaking energy, maximum point stress and tensile modulus.

The composition of the 0.75 mm thick sheet obtained in the manner as described in this Example, its shear storage modulus G' at 23° C., measured in the same manner as described above, loss tangent peak temperature difference, tear strength ratio, breaking energy ratio, maximum point stress ratio and tensile modulus ratio are also shown in the following Tables 2 and 5. The loss tangent peak temperature difference is given by loss tangent peak temperature (B)—loss tangent peak temperature (A). The tear strength ratio, breaking energy ratio, maximum point stress ratio and tensile modulus ratio are ratios in their values of the sheet consisting of the second polyvinyl acetal resin layer (B) to the sheet consisting of the first polyvinyl acetal resin layer (A), i.e., given by B/A.

The thermoplastic resin sheet, as obtained in the manner as described above, was subjected to a falling ball test for evaluation of its penetration resistance and to a pummel test for evaluation of its adhesion to the glass. Those tests were performed according to the following procedures.

(g) Falling ball test

Measurement was performed according to JIS R 3212, that is, by dropping a steel ball having a mass of 2,260±20 g and a diameter of about 82 mm from various heights on a central part of an about 300×300 mm square laminated glass sample kept at a predetermined temperature for at least 4 hours. When this steel ball was dropped, the height at which 50% of samples did not allow it to penetrate was rated as passing and determined to be a penetration resistance performance (MBH).

(h) Pummel test

The glass laminate is refrigerated to −18° C., placed on a metal substrate and then struck with a 500 g hammer until it was pulverized. In this instance, the laminate is evaluated by a pummel value which ranges from 0 (no adhesion) to 10 (perfect adhesion) depending upon the amount of glass separated from the thermoplastic resin sheet. The below-given Table 1 shows the pummel value as related to a percentage of the film surface exposed to air. British Patent No. 1,093,864 describes the detail of the test. The larger pummel value shows the higher adhesion between the thermoplastic resin sheet and the glass, while the smaller pummel value shows the lower adhesion between the thermoplastic resin sheet and the glass. That is, the lower percentage of the film surface exposed to air shows separation or scattering of the smaller amount of dangerous glass fragments from the laminated glass when broken by application of an impact and thus shows a higher safety level to a passenger such as in a vehicle.

In this specification, different pummel values indicate different adhesion levels, while the identical pummel value indicates an equivalent adhesion level.

TABLE 1

| Percentage of Film Surface Exposed (%) | Pummel Value |
|---|---|
| 100 | 0 |
| 90 | 1 |
| 85 | 2 |
| 60 | 3 |
| 40 | 4 |
| 20 | 5 |
| 10 | 6 |

TABLE 1-continued

| Percentage of Film Surface Exposed (%) | Pummel Value |
|---|---|
| 5 | 7 |
| 2 or Less | 8 |

(i) Impact resistance test

An impact resistance test was performed according to JIS R3211 and 3212 to evaluate the amount of glass separated. That is, a steel ball having a mass of 227±2 g and a diameter of about 38 mm was dropped on a central part of an about 300×300 mm square laminated glass sample maintained at a predetermined temperature for over 4 hours. The steel ball was dropped from the height of 11 m or 9.5 m when the predetermined temperature was 40±2° C. or −20±2° C. The total mass of fragments separated from a side of the laminated glass, opposite to a surface of the laminated glass on which an impact was imposed, was measured to evaluate impact resistance. That is, the smaller amount of separated fragments shows separation or scattering of the smaller amount of dangerous glass fragments from the laminated glass when broken by application of an impact and thus shows a higher safety level to a passenger such as in a vehicle. In JIS R 3211 and 3212, the amount of separated fragments that is allowed to pass the test is specified with respect to the thickness of the laminated glass. Instead, in the present invention, safety evaluation was relatively made according to the amount of separated fragments.

The results are shown in the following Tables 2-10.

EXAMPLES 2-7

As shown in the following Tables 2-10, the compositions of the first and second polyvinyl acetal resin layers (A) and (B) were altered. Optionally, the ratio in thickness of the polyvinyl acetal resin layer (B) to (A) was changed (Example 3). Otherwise, the procedure of Example 1 was followed to obtain thermoplastic resin sheets and build up laminates for evaluation. The results are shown in Tables 2-10.

EXAMPLES 8-9

The thickness of each glass was changed so that the surface density of the laminate was rendered to 9.8 kg/m$^2$. Otherwise, the procedure of Example 1 was followed to obtain thermoplastic resin sheets and buildup laminates for evaluation. The results are shown in Tables 2-10.

EXAMPLE 10

0.125 mm thick first polyvinyl acetal resin layers (A) having differing magnesium contents were prepared. Separately, a second polyvinyl acetal resin layer (B) was prepared. The resulting 3 types of layers were stacked in the sequence of (A)/(B)/(A) and thermally bonded by a pressing machine to obtain a 0.75 mm thick three-layer thermoplastic resin sheet. Also, a laminate was built up in the same manner as in Example 1.

Further, in the falling ball test, the steel ball was dropped on the both sides of the laminate, i.e., one side where the thermoplastic resin sheet has a relatively high adhesion to the glass and the other side where the thermoplastic resin sheet has a relatively low adhesion to the glass. Otherwise, the procedure of Example 1 was followed to evaluate the laminate. The results are shown in Tables 2-10.

EXAMPLES 11-18

As shown in the following Tables 2-10, the compositions of the first and second polyvinyl acetal resin layers (A) and (B) were altered. Otherwise, the procedure of Example 1 was followed to obtain thermoplastic resin sheets and build up laminates for evaluation. The results are shown in Tables 2-10.

COMPARATIVE EXAMPLES 1-3

As shown in the following Tables 2-10, a 0.75 mm thick thermoplastic resin sheet comprised solely of a first polyvinyl acetal resin layer (A) was obtained. The procedure of Example 1 was followed, except that this thermoplastic resin sheet was used, to build up laminates for evaluation by a falling ball test.

COMPARATIVE EXAMPLES 4-7

Thermoplastic resin sheets were obtained using the first and second polyvinyl acetal resin layers (A) and (B) having the compositions specified in Tables 2-10. The procedure of Example 1 was followed, except that thus-obtained thermoplastic resin sheets were used, to build up laminates. These laminates were evaluated in the same manner as in Example 1. The results are shown in the following Tables 2-10.

COMPARATIVE EXAMPLE 8

A laminate was built up using the same thermoplastic resin sheet as in Comparative Example 1, except that the thickness of each glass was changed so that the surface density of the laminate was rendered to 9.8 kg/m$^2$. This laminate was evaluated in the same manner as in Example 1. The results are shown in Tables 2-10.

TABLE 2

| | | | | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Layer (A) | Resin | Amount | Parts by Weight | 100 | 100 | 100 | 100 | 100 | 100 | 100 | 100 | 100 | 100 |
| | Aldehyde(a) | Type | Carbon Number | 4 | 4 | 4 | 4 | 4 | 4 | 4 | 4 | 4 | 4 |
| | | Amount | mol % | 68.5 | 68.5 | 68.5 | 68.5 | 68.5 | 68.5 | 68.5 | 68.5 | 68.5 | 68.5 |
| | Ester Group Content | Type | Type | Acetyl Group | Acetyl Group | Acetyl Group | Acetyl Group | Acetyl Group | Acetyl Group | Acetyl Group | Acetyl Group | Acetyl Group | Acetyl Group |
| | | Amount | mol % | 0.7 | 0.7 | 0.7 | 0.7 | 0.7 | 0.7 | 0.7 | 0.7 | 0.7 | 0.7 |
| | Polymerization Degree of Polyvinyl Alcohol(A) | | | 1700 | 1700 | 1700 | 1700 | 1700 | 1700 | 1700 | 1700 | 1700 | 1700 |
| | Plasticizer | Amount | Parts by Weight | 40 | 40 | 40 | 40 | 36 | 34 | 30 | 40 | 40 | 40 |
| | | Composition | | 3GO | 3GO | 3GO | 3GO | 3GO | 3GO | 3GO | 3GO | 3GO | 3GO |
| | Shear Storage Modulus at 23° C. (10 Hz, A) | G'(A) | MPa | 18.20 | 18.20 | 18.20 | 18.20 | 20.50 | 37.40 | 60.63 | 18.20 | 18.20 | 18.20 |
| | Loss Tangent at 23° C. (10 Hz, A) | tan δ (A) | | 0.68 | 0.68 | 0.68 | 0.68 | 0.63 | 0.55 | 0.40 | 0.68 | 0.68 | 0.68 |
| | Loss Tangent (10 Hz, A) Peak Temperature | Tg(A) | ° C. | 31.00 | 31.00 | 31.00 | 31.00 | 37.03 | 38.33 | 39.96 | 31.00 | 31.00 | 31.00 |
| | Temperature Region for Loss Tangent of at Least 0.3 (10 Hz, A) | | ° C. | 11~49 | 11~49 | 11~49 | 11~49 | 16~52 | 18~54 | 22~56 | 11~49 | 11~49 | 11~49 |
| | Temperature Region for Loss Tangent of at Least 0.5 (10 Hz, A) | | ° C. | 19~43 | 19~43 | 19~43 | 19~43 | 32~41 | 34~42 | 35~45 | 19~43 | 19~43 | 19~43 |
| | Tear Strength(A) | | N/mm | 52.20 | 52.20 | 52.20 | 52.20 | 60.82 | 64.88 | 74.74 | 52.20 | 52.20 | 52.20 |
| | Breaking Energy(A) | | J/mm$^2$ | 1.19 | 1.19 | 1.19 | 1.19 | 1.61 | 1.64 | 1.85 | 1.19 | 1.19 | 1.19 |
| | Maximum Point Stress(A) | | MPa | 29.60 | 29.60 | 29.60 | 29.60 | 26.71 | 26.59 | 28.24 | 29.60 | 29.60 | 29.60 |
| | Tensile Modulus(A) | | MPa | 7.20 | 7.20 | 7.20 | 7.20 | 8.59 | 9.14 | 11.34 | 7.20 | 7.20 | 7.20 |

TABLE 3

| | | | | Example | | | | | | | |
|---|---|---|---|---|---|---|---|---|---|---|---|
| | | | | 11 | 12 | 13 | 14 | 15 | 16 | 17 | 18 |
| Layer (A) | Resin | Amount | Parts by Weight | 100 | 100 | 100 | 100 | 100 | 100 | 100 | 100 |
| | Aldehyde(a) | Type | Carbon Number | 4 | 4 | 4 | 4 | 4 | 4 | 4 | 4 |
| | | Amount | mol % | 68.5 | 68.5 | 68.5 | 68.5 | 68.5 | 68.5 | 68.5 | 68.5 |
| | Ester Group Content | Type | Type | Acetyl Group | Acetyl Group | Acetyl Group | Acetyl Group | Acetyl Group | Acetyl Group | Acetyl Group | Acetyl Group |
| | | Amount | mol % | 0.7 | 0.7 | 0.7 | 0.7 | 0.7 | 0.7 | 0.7 | 0.7 |

TABLE 3-continued

|  |  |  | Example 11 | Example 12 | Example 13 | Example 14 | Example 15 | Example 16 | Example 17 | Example 18 |
|---|---|---|---|---|---|---|---|---|---|---|
| Polymerization Degree of Polyvinyl Alcohol(A) |  |  | 1700 | 1700 | 1700 | 1700 | 1700 | 1700 | 1700 | 1700 |
| Plasticizer | Amount | Parts by Weight | 40 | 40 | 40 | 40 | 40 | 40 | 40 | 40 |
|  | Composition |  | 3GO | 3GO | 3GO | 3GO | 3GO | 3GO | 3GO | 3GO |
| Shear Storage Modulus at 23° C. (10 Hz, A) | G'(A) | MPa | 18.20 | 18.20 | 18.20 | 18.20 | 18.20 | 18.20 | 18.20 | 18.20 |
| Loss Tangent at 23° C. (10 Hz, A) | tan δ (A) |  | 0.68 | 0.68 | 0.68 | 0.68 | 0.68 | 0.68 | 0.68 | 0.68 |
| Loss Tangent (10 Hz, A) Peak Temperature | Tg(A) | ° C. | 31.00 | 31.00 | 31.00 | 31.00 | 31.00 | 31.00 | 31.00 | 31.00 |
| Temperature Region for Loss Tangent of at Least 0.3 (10 Hz, A) |  | ° C. | 11~49 | 11~49 | 11~49 | 11~49 | 11~49 | 11~49 | 11~49 | 11~49 |
| Temperature Region for Loss Tangent of at Least 0.5 (10 Hz, A) |  | ° C. | 19~43 | 19~43 | 19~43 | 19~43 | 19~43 | 19~43 | 19~43 | 19~43 |
| Tear Strength(A) |  | N/mm | 52.20 | 52.20 | 52.20 | 52.20 | 52.20 | 52.20 | 52.20 | 52.20 |
| Breaking Energy(A) |  | J/mm² | 1.19 | 1.19 | 1.19 | 1.19 | 1.19 | 1.19 | 1.19 | 1.19 |
| Maximum Point Stress(A) |  | MPa | 29.60 | 29.60 | 29.60 | 29.60 | 29.60 | 29.60 | 29.60 | 29.60 |
| Tensile Modulus(A) |  | MPa | 7.20 | 7.20 | 7.20 | 7.20 | 7.20 | 7.20 | 7.20 | 7.20 |

TABLE 4

|  |  |  |  | Comparative Example 1 | 2 | 3 | 4 | 5 | 6 | 7 | 8 |
|---|---|---|---|---|---|---|---|---|---|---|---|
| Layer (A) | Resin | Amount | Parts by Weight | 100 | 100 | 100 | 100 | 100 | 100 | 100 | 100 |
|  | Aldehyde(a) | Type | Carbon Number | 4 | 4 | 4 | 4 | 4 | 4 | 4 | 4 |
|  |  | Amount | mol % | 68.5 | 68.5 | 65.1 | 68.5 | 68.5 | 68.5 | 68.5 | 68.5 |
|  | Ester Group Content | Type | Type | Acetyl Group | Acetyl Group | Acetyl Group | Acetyl Group | Acetyl Group | Acetyl Group | Acetyl Group | Acetyl Group |
|  |  | Amount | mol % | 0.7 | 0.7 | 0.7 | 0.7 | 0.7 | 0.7 | 0.7 | 0.7 |
| Polymerization Degree of Polyvinyl Alcohol(A) |  |  |  | 1700 | 1700 | 1700 | 1700 | 1700 | 1700 | 1700 | 1700 |
| Plasticizer | Amount | Parts by Weight |  | 40 | 32 | 25 | 36 | 40 | 30 | 38 | 40 |
|  | Composition |  |  | 3GO | 3GO | 3GO | 3GO | 3GO | 3GO | 3GO | 3GO |
| Shear Storage Modulus at 23° C. (10 Hz, A) | G'(A) | MPa |  | 18.20 | 51.70 | 59.60 | 20.50 | 18.20 | 63.06 | 25.00 | 18.20 |
| Loss Tangent at 23° C. (10 Hz, A) | tan δ (A) |  |  | 0.68 | 0.42 | 0.29 | 0.63 | 0.68 | 0.40 | 0.57 | 0.68 |
| Loss Tangent (10 Hz, A) Peak Temperature | Tg(A) | ° C. |  | 31.00 | 35.95 | 43.95 | 33.90 | 31.00 | 39.96 | 34.00 | 31.00 |
| Temperature Region for Loss Tangent of at Least 0.3 (10 Hz, A) |  | ° C. |  | 11~49 | 20~54 | 28~62 | 16~52 | 11~49 | 22~56 | 14~52 | 11~49 |
| Temperature Region for Loss Tangent of at Least 0.5 (10 Hz, A) |  | ° C. |  | 19~43 | 24~50 | 32~58 | 33~41 | 19~43 | 35~45 | 22~46 | 19~43 |
| Tear Strength(A) |  | N/mm |  | 52.20 | 69.48 | 93.20 | 60.82 | 52.20 | 79.90 | 53.00 | 52.20 |
| Breaking Energy(A) |  | J/mm² |  | 1.19 | 1.86 | 2.11 | 1.61 | 1.19 | 1.85 | 1.19 | 1.19 |
| Maximum Point Stress(A) |  | MPa |  | 29.60 | 29.88 | 28.43 | 26.71 | 29.60 | 28.24 | 29.00 | 29.60 |
| Tensile Modulus(A) |  | MPa |  | 7.20 | 11.53 | 202.24 | 8.59 | 7.20 | 11.34 | 9.00 | 7.20 |

TABLE 5

|  |  |  |  | Example 1 | 2 | 3 | 4 | 5 | 6 | 7 | 8 | 9 | 10 |
|---|---|---|---|---|---|---|---|---|---|---|---|---|---|
| Layer (B) | Resin | Amount | Parts by Weight | 100 | 100 | 100 | 100 | 100 | 100 | 100 | 100 | 100 | 100 |
|  | Aldehyde(b) | Type | Carbon Number | C2 | C2 | C2 | C2 | C2 | C2 | C2 | C2 | C2 | C2 |
|  |  | Amount | mol % | 37.8 | 37.8 | 37.8 | 38.4 | 37.8 | 37.8 | 38.4 | 37.8 | 37.8 | 37.8 |
|  | Aldehyde(a) | Type | Carbon Number | C4 | C4 | C4 | C4 | C4 | C4 | C4 | C4 | C4 | C4 |
|  |  | Amount | mol % | 31.8 | 31.8 | 31.8 | 29.3 | 31.8 | 31.8 | 29.3 | 31.8 | 31.8 | 31.8 |
|  | Total Degree of Acetalization |  | mol % | 69.5 | 69.5 | 69.5 | 67.7 | 69.5 | 69.5 | 67.7 | 69.5 | 69.5 | 69.5 |

TABLE 5-continued

|  |  |  | Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Ester Group Content | Type | | 1.3 Acetyl Group | 1.3 Acetyl Group | 1.3 Acetyl Group | 0.6 Acetyl Group | 1.3 Acetyl Group | 1.3 Acetyl Group | 0.6 Acetyl Group | 1.3 Acetyl Group | 1.3 Acetyl Group | 1.3 Acetyl Group |
|  | Amount | mol % | | | | | | | | | | |
| Polymerization Degree of Polyvinyl Alcohol(B) | | | 2000 | 2000 | 2000 | 2400 | 2000 | 2000 | 2400 | 2000 | 2000 | 2000 |
| Plasticizer | Amount | Parts by Weight | 25 | 30 | 30 | 30 | 32 | 30 | 30 | 25 | 30 | 30 |
|  | Composition | | 3GO | 3GO | 3GO | 3GO | 3GO | 3GO | 3GO | 3GO | 3GO | 3GO |
| Shear Storage Modulus at 23° C. (10 Hz, B) | G'(B) | MPa | 76.00 | 50.30 | 50.30 | 64.10 | 39.30 | 50.30 | 64.10 | 76.00 | 50.30 | 50.30 |
| Loss Tangent at 23° C. (10 Hz, B) | tan δ (B) | | 0.29 | 0.24 | 0.24 | 0.28 | 0.29 | 0.24 | 0.28 | 0.29 | 0.24 | 0.24 |
| Loss Tangent (10 Hz, B) Peak Temperature | Tg(B) | ° C. | 52.00 | 47.90 | 47.90 | 48.05 | 45.95 | 47.90 | 48.05 | 52.00 | 47.90 | 47.90 |
| Temperature Region for Loss Tangent of at Least 0.3 (10 Hz, B) | | ° C. | 36~70 | 30~66 | 30~66 | 28~64 | 28~62 | 30~66 | 28~64 | 36~70 | 30~66 | 30~66 |
| Temperature Region for Loss Tangent of at Least 0.5 (10 Hz, B) | | ° C. | 40~66 | 36~60 | 36~60 | 34~60 | 32~58 | 36~60 | 34~60 | 40~66 | 36~60 | 36~60 |
| Tear Strength(B) | | N/mm | 120.0 | 111.0 | 111.0 | 113.0 | 101.2 | 111.0 | 113.0 | 120.0 | 111.0 | 111.0 |
| Breaking Energy(B) | | J/mm² | 2.1 | 2.0 | 2.0 | 2.5 | 2.3 | 2.0 | 2.5 | 2.1 | 2.0 | 2.0 |
| Maximum Point Stress(B) | | MPa | 29.9 | 33.4 | 33.4 | 31.7 | 31.7 | 33.4 | 31.7 | 29.9 | 33.4 | 33.4 |
| Tensile Modulus(B) | | MPa | 568.6 | 360.6 | 360.6 | 434.6 | 133.8 | 360.6 | 434.6 | 568.6 | 360.6 | 360.6 |

TABLE 6

|  |  |  |  | Example | | | | | | | |
|---|---|---|---|---|---|---|---|---|---|---|---|
|  |  |  |  | 11 | 12 | 13 | 14 | 15 | 16 | 17 | 18 |
| Layer (B) | Resin | Amount | Parts by Weight | 100 | 100 | 100 | 100 | 100 | 100 | 100 | 100 |
|  | Aldehyde(b) | Type | Carbon Number | C2 | C2 | C2 | C3 | C3 | C3 | C2 | C2 |
|  |  | Amount | mol % | 71.9 | 58.9 | 56.1 | 36.5 | 69.5 | 71.9 | 37.8 | 71.9 |
|  | Aldehyde(a) | Type | Carbon Number | C4 | — | C4 | C4 | C4 | — | C6 | C6 |
|  |  | Amount | mol % | 1.8 | 0 | 1.8 | 31.5 | 1.8 | 0 | 30.3 | 1.8 |
|  | Total Degree of Acetalization | | mol % | 73.7 | 58.9 | 57.9 | 68 | 71.3 | 71.9 | 68.1 | 73.7 |
|  | Ester Group Content | Type | | 1.8 Acetyl Group | 15.4 Acetyl Group | 16.3 Acetyl Group | 0.7 Acetyl Group | 0.7 Acetyl Group | 1.3 Acetyl Group | 0.7 Acetyl Group | 0.7 Acetyl Group |
|  |  | Amount | mol % | | | | | | | | |
|  | Polymerization Degree of Polyvinyl Alcohol(B) | | | 2000 | 1800 | 1500 | 2400 | 2000 | 2000 | 2000 | 2000 |
|  | Plasticizer | Amount | Parts by Weight | 30 | 30 | 30 | 30 | 30 | 30 | 30 | 30 |
|  |  | Composition | | 3GO | 3GO | 3GO | 3GO | 3GO | 3GO | 3GO | 3GO |
| Shear Storage Modulus at 23° C. (10 Hz, B) | G'(B) | MPa | | 61.60 | 124.00 | 89.90 | 40.30 | 52.00 | 55.00 | 39.20 | 60.30 |
| Loss Tangent at 23° C. (10 Hz, B) | tan δ (B) | | | 0.17 | 0.22 | 0.25 | 0.25 | 0.25 | 0.25 | 0.26 | 0.18 |
| Loss Tangent (10 Hz, B) Peak Temperature | Tg(B) | ° C. | | 64.00 | 57.90 | 58.00 | 45.30 | 48.30 | 60.00 | 45.00 | 62.00 |
| Temperature Region for Loss Tangent of at Least 0.3 (10 Hz, B) | | ° C. | | 46~82 | 38~74 | 28~82 | 28~64 | 30~66 | 40~78 | 28~62 | 44~80 |
| Temperature Region for Loss Tangent of at Least 0.5 (10 Hz, B) | | ° C. | | 54~76 | 44~70 | 44~72 | 34~58 | 36~60 | 44~72 | 32~58 | 43~74 |
| Tear Strength(B) | | N/mm | | 159.6 | 144.5 | 157.9 | 100.2 | 115.0 | 150.0 | 102.3 | 145.8 |
| Breaking Energy(B) | | J/mm² | | 3.0 | 2.8 | 3.1 | 2.3 | 2.2 | 2.4 | 2.3 | 2.6 |
| Maximum Point Stress(B) | | MPa | | 43.2 | 39.0 | 41.2 | 30.1 | 35.1 | 38.0 | 31.6 | 39.5 |
| Tensile Modulus(B) | | MPa | | 852.5 | 729.0 | 850.5 | 315.3 | 380.3 | 632.5 | 150.5 | 780.3 |

TABLE 7

| | | | | Comparative Example | | | | | | | |
|---|---|---|---|---|---|---|---|---|---|---|---|
| | | | | 1 | 2 | 3 | 4 | 5 | 6 | 7 | 8 |
| Layer (B) | Resin | Amount | Parts by Weight | — | — | — | 100 | 100 | 100 | 100 | — |
| | Aldehyde(b) | Type | Carbon Number | — | — | — | — | — | — | — | — |
| | | Amount | mol % | — | — | — | — | — | — | — | — |
| | Aldehyde(a) | Type | Carbon Number | — | — | — | C4 | C4 | C4 | C4 | — |
| | | Amount | mol % | — | — | — | 68.5 | 65.1 | 65.1 | 61.8 | — |
| | Total Degree of Acetalization | | mol % | — | — | — | 68.5 | 65.1 | 65.1 | 61.8 | — |
| | Ester Group Content | Type | | — | — | — | 0.7 | 0.7 | 0.7 | 13.8 | — |
| | | Amount | mol % | — | — | — | Acetyl Group | Acetyl Group | Acetyl Group | Acetyl Group | — |
| | Polymerization Degree of Polyvinyl Alcohol(B) | | | — | — | — | 1700 | 1700 | 1700 | 2300 | — |
| | Plasticizer | Amount | Parts by Weight | — | — | — | 30 | 25 | 30 | 67.5 | — |
| | | Composition | | — | — | — | 3GO | 3GO | 3GO | 3GO | — |
| | Shear Storage Modulus at 23° C. (10 Hz, B) | G'(B) | MPa | — | — | — | 60.63 | 56.60 | 52.80 | 0.30 | — |
| | Loss Tangent at 23° C. (10 Hz, B) | tan δ (B) | | — | — | — | 0.40 | 0.29 | 0.34 | 0.36 | — |
| | Loss Tangent (10 Hz, B) Peak Temperature | Tg(B) | ° C. | — | — | — | 39.96 | 43.95 | 39.95 | 4.00 | — |
| | Temperature Region for Loss Tangent of at Least 0.3 (10 Hz. B) | | ° C. | — | — | — | 22~56 | 28~62 | 24~58 | −22~22 | — |
| | Temperature Region for Loss Tangent of at Least 0.5 (10 Hz. B) | | ° C. | — | — | — | 35~45 | 32~58 | 28~52 | −11~16 | — |
| | Tear Strength(B) | | N/mm | — | — | — | 79.90 | 93.20 | 95.10 | 4.48 | — |
| | Breaking Energy(B) | | J/mm² | — | — | — | 1.85 | 2.11 | 2.26 | 0.26 | — |
| | Maximum Point Stress(B) | | MPa | — | — | — | 28.24 | 28.43 | 27.47 | 3.18 | — |
| | Tensile Modulus(B) | | MPa | — | — | — | 11.34 | 202.24 | 11.84 | 2.80 | — |

TABLE 8

| | | | | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Ratio | Unit(Y)/Unit(X) | | | 1.19 | 1.19 | 1.19 | 1.31 | 1.19 | 1.19 | 1.31 | 1.19 | 1.19 | 1.19 |
| | Shear Storage Modulus (10 Hz, B/A) | | | 4.18 | 2.76 | 2.76 | 3.52 | 1.92 | 1.34 | 1.06 | 4.18 | 2.76 | 2.76 |
| | Loss Tangent Peak Temperature Difference (10 Hz, Tg(B) − Tg(A)) | | ° C. | 21.00 | 16.90 | 16.90 | 17.05 | 8.92 | 9.57 | 8.09 | 21.00 | 16.90 | 16.90 |
| | Tear Strength(B/A) | | | 2.30 | 2.13 | 2.13 | 2.16 | 1.66 | 1.71 | 1.51 | 2.30 | 2.13 | 2.13 |
| | Breaking Energy(B/A) | | | 1.79 | 1.69 | 1.69 | 2.11 | 1.41 | 1.22 | 1.35 | 1.79 | 1.69 | 1.69 |
| | Maximum Point Stress(B/A) | | | 1.01 | 1.13 | 1.13 | 1.07 | 1.19 | 1.26 | 1.12 | 1.01 | 1.13 | 1.13 |
| | Tensile Modulus(B/A) | | | 78.97 | 50.08 | 50.08 | 60.36 | 15.57 | 39.45 | 38.32 | 78.97 | 50.08 | 50.08 |
| | Plasticizer(B/A) | | | 1.60 | 1.33 | 1.33 | 1.33 | 1.13 | 1.13 | 1.00 | 1.60 | 1.33 | 1.33 |
| | Layer Thickness(B/A) | | | 2 | 2 | 4 | 2 | 4 | 4 | 4 | 2 | 4 | 4 |
| Configuration | Thickness of Glass (Transparent Plate) on Layer 12 | | mm | 2.5 | 2.5 | 2.5 | 2.5 | 2.5 | 2.5 | 2.5 | 1.8 | 1.8 | 2.5 |
| | Thickness of Glass (Transparent Plate) on Layer 13 | | mm | 2.5 | 2.5 | 2.5 | 2.5 | 2.5 | 2.5 | 2.5 | 1.8 | 1.8 | 2.5 |
| | Laminate Surface Density | | kg/m² | 13.3 | 13.3 | 13.3 | 13.3 | 13.3 | 13.3 | 13.3 | 9.8 | 9.8 | 13.3 |
| Performance | Falling Ball Test | 0° C. | MBH, m | 6.0 | 4.5 | 5.6 | 4.9 | 5.8 | 4.4 | 4.1 | 5.5 | 4.3 | 6.0 |
| | | 10° C. | MBH, m | 7.5 | 6.2 | 7.4 | 6.4 | 6.8 | 6.9 | 6.4 | 7.0 | 6.0 | 7.5 |
| | | 23° C. | MBH, m | 7.5 | 7.5 | 8.1 | 7.4 | 6.8 | 7.4 | 6.9 | 7.0 | 7.0 | 7.5 |
| | | 30° C. | MBH, m | 7.5 | 6.5 | 5.4 | 6.4 | 6.1 | 6.4 | 7.4 | 7.0 | 6.0 | 7.5 |
| | | 40° C. | MBH, m | 5.5 | 5.0 | 4.4 | 4.9 | 4.1 | 4.4 | 4.9 | 5.0 | 4.8 | 5.5 |
| | Pummerl Value | at Layer 12 Side | | 5 | 5 | 5 | 5 | 5 | 5 | 5 | 5 | 5 | 2 |
| | | at Layer 13 Side | | 5 | 5 | 5 | 5 | 5 | 5 | 5 | 5 | 5 | 5 |
| Evaluation | Broading of MBH | | | ○ | ○ | ○ | ○ | ○ | ○ | ○ | ○ | ○ | ○ |
| | MBH Maximum Point | MBH | m | 7.5 | 7.5 | 8.1 | 7.4 | 6.8 | 7.4 | 7.4 | 7.0 | 7.0 | 8.5 | 7.5 |
| | Impact Resistance Test (Amount of Glass Separated from a Side Opposite to a Side | Amount of Glass Separated at +40° C. | g | 2.0 | 1.9 | 2.1 | 2.0 | 2.0 | 1.9 | 1.9 | 1.9 | 1.9 | 1.92 ※1 | 5.56 ※2 |

TABLE 8-continued

|  |  |  | Example |  |  |  |  |  |  |  |  | 10 |  |
|---|---|---|---|---|---|---|---|---|---|---|---|---|---|
|  |  |  | 1 | 2 | 3 | 4 | 5 | 6 | 7 | 8 | 9 | | |
|  | on Which a Steel Ball Dropped) | Amount of Glass Separated at −20° C. | 2.0 | 2.0 | 1.9 | 1.9 | 1.9 | 1.9 | 2.0 | 2.0 | 2.0 | 1.98 ※1 | 7.6 ※2 |
|  |  | Evaluation | ○ | ○ | ○ | ○ | ○ | ○ | ○ | ○ | ○ | ○ ※1 | X ※2 |
| Overall Evaluation |  |  | ○ | ○ | ○ | ○ | ○ | ○ | ○ | ○ | ○ | ○ ※1 | X ※2 |

※1 Results Obtained When Falling Ball Test And Performance Evaluation Were Carried Out at Layer 12 Side
※2 Results Obtained When Falling Ball Test And Performance Evaluation Were Carried Out at Layer 13 Side
In broading of MBH evaluation, ○ was given when every mbh value was at least 4 m over the range of 0-40° C.
In overall evaluation, ○ was given when broading of MBH and amount of glass separated were both rated as ○.

TABLE 9

|  |  |  |  | Example |  |  |  |  |  |  |  |
|---|---|---|---|---|---|---|---|---|---|---|---|
|  |  |  |  | 11 | 12 | 13 | 14 | 15 | 16 | 17 | 18 |
| Ratio | Unit(Y)/Unit(X) |  |  | 39.94 | — | 41.17 | 1.16 | 38.61 | — | 1.25 | 39.94 |
|  | Shear Storage Modulus (10 Hz, B/A) |  |  | 3.38 | 6.81 | 4.94 | 2.21 | 2.86 | 3.02 | 2.15 | 3.31 |
|  | Loss Tangent Peak Temperature Difference (10 Hz, Tg(B) − Tg(A)) |  | ° C. | 33.00 | 26.90 | 27.00 | 14.30 | 17.30 | 29.00 | 14.00 | 31.00 |
|  | Tear Strength(B/A) |  |  | 3.06 | 2.77 | 3.02 | 1.92 | 2.20 | 2.87 | 1.96 | 2.79 |
|  | Breaking Energy(B/A) |  |  | 2.52 | 2.36 | 2.57 | 1.94 | 1.86 | 2.03 | 1.94 | 2.19 |
|  | Maximum Point Stress(B/A) |  |  | 1.46 | 1.32 | 1.39 | 1.02 | 1.19 | 1.28 | 1.07 | 1.33 |
|  | Tensile Modulus(B/A) |  |  | 118.40 | 101.25 | 118.13 | 43.79 | 52.82 | 87.85 | 20.90 | 108.38 |
|  | Plasticizer(B/A) |  |  | 1.33 | 1.33 | 1.33 | 1.33 | 1.33 | 1.33 | 1.33 | 1.33 |
|  | Layer Thickness(B/A) |  |  | 4 | 4 | 4 | 4 | 4 | 4 | 4 | 4 |
| Configuration | Thickness of Glass (Transparent Plate) on Layer 12 |  | mm | 2.5 | 2.5 | 2.5 | 2.5 | 2.5 | 2.5 | 2.5 | 2.5 |
|  | Thickness of Glass (Transparent Plate) on Layer 13 |  | mm | 2.5 | 2.5 | 2.5 | 2.5 | 2.5 | 2.5 | 2.5 | 2.5 |
|  | Laminate Surface Density |  | kg/m² | 13.3 | 13.3 | 13.3 | 13.3 | 13.3 | 13.3 | 13.3 | 13.3 |
| Performance | Falling Ball Test | 0° C. | MBH, m | 5.0 | 4.5 | 4.5 | 5.8 | 5.0 | 4.5 | 5.6 | 5.3 |
|  |  | 10° C. | MBH, m | 7.3 | 7.0 | 7.0 | 7.5 | 7.5 | 6.5 | 7.5 | 7.3 |
|  |  | 23° C. | MBH, m | 8.3 | 8.5 | 8.3 | 7.8 | 8.0 | 8.0 | 7.8 | 8.0 |
|  |  | 30° C. | MBH, m | 6.0 | 6.5 | 6.5 | 5.0 | 5.8 | 6.0 | 5.0 | 5.5 |
|  |  | 40° C. | MBH, m | 5.0 | 5.5 | 5.5 | 4.5 | 4.5 | 5.3 | 4.5 | 4.8 |
|  | Pummerl Value | at Layer 12 Side |  | 5 | 5 | 5 | 5 | 5 | 5 | 5 | 5 |
|  |  | at Layer 13 Side |  | 5 | 5 | 5 | 5 | 5 | 5 | 5 | 5 |
| Evaluation | Broading of MBH |  |  | ○ | ○ | ○ | ○ | ○ | ○ | ○ | ○ |
|  | MBH Maximum Point | MBH | m | 8.3 | 8.5 | 8.3 | 7.8 | 8.0 | 8.0 | 7.8 | 8.0 |
|  | Impact Resistance Test (Amount of Glass Separated from a Side Opposite to a Side on Which a Steel Ball Dropped) | Amount of Glass Separated at +40° C. | g | 1.9 | 2.0 | 1.8 | 1.9 | 1.7 | 1.8 | 1.8 | 1.9 |
|  |  | Amount of Glass Separated at −20° C. | g | 1.9 | 2.0 | 1.6 | 1.5 | 2.0 | 1.9 | 1.8 | 1.7 |
|  |  | Evaluation |  | ○ | ○ | ○ | ○ | ○ | ○ | ○ | ○ |
| Overall Evaluation |  |  |  | ○ | ○ | ○ | ○ | ○ | ○ | ○ | ○ |

※1 Results Obtained When Falling Ball Test And Performance Evaluation Were Carried Out at Layer 12 Side
※2 Results Obtained When Falling Ball Test And Performance Evaluation Were Carried Out at Layer 13 Side
In broading of MBH evaluation, ○ was given when every mbh value was at least 4 m over the range of 0-40° C.
In overall evaluation, ○ was given when broading of MBH and amount of glass separated were both rated as ○.

TABLE 10

|  |  |  | Comparative Example |  |  |  |  |  |  |  |
|---|---|---|---|---|---|---|---|---|---|---|
|  |  |  | 1 | 2 | 3 | 4 | 5 | 6 | 7 | 8 |
| Ratio | Unit(Y)/Unit(X) |  | — | — | — | — | — | — | — | — |
|  | Shear Storage Modulus(10 Hz, B/A) |  | — | — | — | 2.96 | 3.11 | 0.84 | 0.01 | — |
|  | Loss Tangent Peak Temperature Difference(10 Hz, Tg(B) − Tg(A)) | ° C. | — | — | — | 6.06 | 12.95 | −0.01 | −30.00 | — |
|  | Tear Strength(B/A) |  | — | — | — | 1.31 | 1.79 | 1.19 | 0.08 | — |
|  | Breaking Energy(B/A) |  | — | — | — | 1.15 | 1.78 | 1.22 | 0.22 | — |

TABLE 10-continued

|  |  |  | Comparative Example | | | | | | | |
|---|---|---|---|---|---|---|---|---|---|---|
|  |  |  | 1 | 2 | 3 | 4 | 5 | 6 | 7 | 8 |
| Configuration | Maximum Point Stress(B/A) |  | — | — | — | 1.06 | 0.96 | 0.97 | 0.11 | — |
|  | Tensile Modulus(B/A) |  | — | — | — | 1.3 | 28.1 | 1.0 | 0.3 | — |
|  | Plasticizer(B/A) |  | — | — | — | 1.2 | 1.6 | 1.0 | 0.6 | — |
|  | Layer Thickness(B/A) |  | — | — | — | 4 | 2 | 4 | 0.33 | — |
|  | Thickness of Glass (Transparent Plate) on Layer 12 | mm | 2.5 | 2.5 | 2.5 | 2.5 | 2.5 | 2.5 | 2.5 | 1.8 |
|  | Thickness of Glass (Transparent Plate) on Layer 13 | mm | 2.5 | 2.5 | 2.5 | 2.5 | 2.5 | 2.5 | 2.5 | 1.8 |
|  | Laminate Surface Density | kg/m² | 13.3 | 13.3 | 13.3 | 13.3 | 13.3 | 13.3 | 13.3 | 9.8 |
| Performance | Falling Ball Test | 0° C. MBH, m | 6.1 | 2.9 | 1.8 | 3.3 | 6.4 | 3.6 | 6.2 | 6.0 |
|  |  | 10° C. MBH, m | 6.1 | 6.4 | 5.1 | 4.6 | 5.9 | 4.9 | 5.7 | 6.5 |
|  |  | 23° C. MBH, m | 6.1 | 7.4 | 7.6 | 6.8 | 6.9 | 6.9 | 5.7 | 5.8 |
|  |  | 30° C. MBH, m | 4.1 | 7.4 | 7.6 | 6.1 | 7.4 | 6.4 | 3.7 | 5.0 |
|  |  | 40° C. MBH, m | 2.6 | 6.9 | 8.1 | 4.1 | 3.9 | 4.4 | 2.7 | 3.0 |
|  | Pummerl Value | at Layer 12 Side | 5 | 5 | 5 | 5 | 5 | 5 | 5 | 5 |
|  |  | at Layer 13 Side | 5 | 5 | 5 | 5 | 5 | 5 | 5 | 5 |
| Evaluation | Broading of MBH |  | X | X | X | X | X | X | X | X |
|  | MBH Maximum Point | MBH m | 6.1 | 7.4 | 8.1 | 6.8 | 7.4 | 6.9 | 6.2 | 6.5 |
|  | Impact Resistance Test (Amount of Glass Separated from a Side Opposite to a Side on Which a Steel Ball Dropped) | Amount of Glass Separated at +40° C. g | 1.9 | 2.0 | 2.0 | 2.1 | 2.0 | 2.0 | 2.0 | 1.9 |
|  |  | Amount of Glass Separated at −20° C. g | 2.0 | 2.0 | 2.0 | 1.9 | 1.9 | 2.0 | 2.0 | 2.0 |
|  |  | Evaluation | ○ | ○ | ○ | ○ | ○ | ○ | ○ | ○ |
| Overall Evaluation |  |  | X | X | X | X | X | X | X | X |

In broading of MBH evaluation, ○ was given when every mbh value was at least 4 m over the range of 0-40° C.
In overall evaluation, ○ was given when broading of MBH and amount of glass separated were both rated as ○.

The invention claimed is:

1. An intermediate sheet having a laminated structure including a first polyvinyl acetal resin layer (A) and a second polyvinyl acetal resin layer (B), characterized in that:
   said first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms;
   said second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-carbon atoms and with at least one aldehyde (b) selected from the group consisting of aldehydes having 1-3 carbon atoms; and
   a polymer unit (X) and a polymer unit (Y), in total, account for at least 55% by mole while the first polymer unit (X) alone accounts for 0.5-80% by mole of the total of said coacetalized product, wherein the polymer unit (X) is an acetalized unit derived from the first aldehyde (a) and the polymer unit (Y) is an acetalized unit derived from the second aldehyde (b)
   the plasticizer content of the second polyvinyl acetal resin layer (A) is generally in the range of 30-45 parts by weight, the plasticizer content of the second polyvinyl acetal resin layer (B) is generally in the range of 10-40 parts by weight,
   the plasticizer content (A)/plasticizer content (B) is in the range of 1.0-3, wherein the plasticizer content (A) is a plasticizer content of the first polyvinyl acetal resin layer (A) and the plasticizer content (B) is a plasticizer content of the second polyvinyl acetal resin layer (B).

2. An intermediate sheet having a laminated structure including a first polyvinyl acetal resin layer (A) and a second polyvinyl acetal resin layer (B), characterized in that:
   said first polyvinyl acetal resin layer (A) contains a plasticizer and a first polyvinyl acetal resin obtained via acetalization of polyvinyl alcohol with at least one aldehyde (a) selected from the group consisting of aldehydes having 4-6 carbon atoms;
   said second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-carbon atoms and at least one aldehyde (b) selected from the group consisting of aldehydes having 1-3 carbon atoms;
   said thermoplastic resin sheet has such a structure that the first polyvinyl acetal resin layer (A) is provided on each side of at least one second polyvinyl acetal resin layer (B); and,
   in the second polyvinyl acetal resin layer (B), a polymer unit (X) and a polymer unit (Y), in total, account for at least 55% by mole while the first polymer unit (X) alone accounts for 20-80% by mole of the total of the coacetalized product, wherein the polymer unit (X) is an acetalized unit derived from the first aldehyde (a) and the polymer unit (Y) is an acetalized unit derived from the second aldehyde (b),
   the plasticizer content of the second polyvinyl acetal resin layer (A) is qenerally in the range of 30-45 parts by weight, the plasticizer content of the second polyvinyl acetal resin layer (B) is generally in the range of 10-40 parts by weight,
   the plasticizer content (A)/plasticizer content (B) is in the range of 1.0-3, wherein the plasticizer content (A) is a plasticizer content of the first polyvinyl acetal resin layer (A) and the plasticizer content (B) is a plasticizer content of the second polyvinyl acetal resin layer (B).

3. An intermediate sheet having a laminated structure including a first polyvinyl acetal resin layer (A) and a second polyvinyl acetal resin layer (B), characterized in that:
  said first polyvinyl acetal resin layer(A) contains a plasticizer and a first polyvinyl acetal resin obtained via acetalization of polyvinyl alcohol with at least one aldehyde (a) selected from the group consisting of aldehydes having 4-carbon atoms;
  said second polyvinyl acetal resin layer (B) contains a plasticizer and a second polyvinyl acetal resin in the form of a coacetalized product obtained via coacetalization of polyvinyl alcohol with at least one aldehyde (a) selected from the group consisting of aldehydes having 4-carbon atoms and at least one aldehyde (b) selected from the group consisting of aldehydes having 1-3 carbon atoms;
  said thermoplastic resin sheet has such a structure that the first polyvinyl acetal resin layer (A) is provided on each side of at least one second polyvinyl acetal resin layer (B); and,
  in the second polyvinyl acetal resin layer (B), a polymer unit (X) and a polymer unit (Y), in total, account for at least 55% by mole while the first polymer unit (X) alone accounts for 0.5-20% by mole of the total of the coacetalized product, wherein the polymer unit (X) is an acetalized unit derived from the first aldehyde (a) and the polymer unit (Y) is an acetalized unit derived from the second aldehyde (b),
  the plasticizer content of the second polyvinyl acetal resin layer (A) is generally in the range of 30-45 parts by weight, the plasticizer content of the second polyvinyl acetal resin layer (B) is generally in the range of 10-40 parts by weight,
  the plasticizer content (A)/plasticizer content (B) is in the range of 1.0-3, wherein the plasticizer content (A) is a plasticizer content of the first polyvinyl acetal resin layer (A) and the plasticizer content (B) is a plasticizer content of the second polyvinyl acetal resin layer (B).

4. An intermediate sheet having a laminated structure including a first polyvinyl acetal resin layer (A) and a second polyvinyl acetal resin layer (B), characterized in that:
  said first polyvinyl acetal resin layer(A) contains a plasticizer and a first polyvinyl acetal resin obtained via acetalization of polyvinyl alcohol with at least one aldehyde (a) selected from the group consisting of aldehydes having 4-6 carbon atoms;
  said second polyvinyl acetal resin layer (B) contains a plasticizer and a second polyvinyl acetal resin obtained via acetalization of polyvinyl alcohol with at least one aldehyde (b) selected from the group consisting of aldehydes having 1-3 carbon atoms;
  said thermoplastic resin sheet has such a structure that the first polyvinyl acetal resin layer (A) is provided on each side of at least one second polyvinyl acetal resin layer (B); and
  said second polyvinyl acetal resin layer (B) has a degree of acetalization of at least 55 mole %
  the plasticizer content of the second polyvinyl acetal resin layer (A) is generally in the range of 30-45 parts by weight, the plasticizer content of the second polyvinyl acetal resin layer (B) is generally in the range of 10-40 parts by weight,
  the plasticizer content (A)/plasticizer content (B) is in the range of 1.0-3, wherein the plasticizer content (A) is a plasticizer content of the first polyvinyl acetal resin layer (A) and the plasticizer content (B) is a plasticizer content of the second polyvinyl acetal resin layer (B).

5. The intermediate sheet as recited in claim 1, characterized in that a molar ratio of the polymer unit (Y) to the polymer unit (X) in the coacetalized product constituting the second polyvinyl acetal resin layer (B), polymer unit (Y)/polymer unit (X), does not exceed 3.5.

6. The intermediate sheet as recited in claim 1, characterized in that a molar ratio of the polymer unit (Y) to the polymer unit (X) in the coacetalized product constituting the second polyvinyl acetal resin layer (B), polymer unit (Y)/polymer unit (X), does not exceed 200.

7. The intermediate sheet as recited in claim 1, characterized in that:
  a temperature t(A) at which a loss tangent tan δ measured at a frequency of 10 Hz for a sheet comprised solely of the polyvinyl acetal resin layer (A) shows a maximum value is in the range of 20-50° C.;
  a temperature t(B) at which a loss tangent tan 67 for a sheet comprised of the second polyvinyl acetal resin layer (B) shows a maximum value is in the range of 35-70° C.; and
  t(B)-t(A) is in the range between 5° C. and 40° C.

8. The intermediate sheet as recited in claim 1, characterized in that:
  a temperature t(A) at which a loss tangent tan δ measured at a frequency of 10 Hz for a sheet comprised solely of the polyvinyl acetal resin layer (A) shows a maximum value is in the range of 20-50° C.;
  a temperature t(B) at which a loss tangent tan δ for a sheet comprised of the second polyvinyl acetal resin layer (B) shows a maximum value is in the range of 40-65° C.; and
  t(B)-t(A) is in the range between 5° C. and 25° C.

9. The intermediate sheet as recited in claim 1, characterized in that an overlapping temperature region exists between a temperature range in which a loss tangent tan δ for a sheet comprised of the first polyvinyl acetal resin layer (A) is at least 0.3 and a temperature range in which a loss tangent tan δ for a sheet comprised of the second polyvinyl acetal resin layer (B) is at least 0.3.

10. The intermediate sheet as recited in claim 1, characterized in that an overlapping temperature region exists between a temperature range in which a loss tangent tan δ for a sheet comprised of the first polyvinyl acetal resin layer (A) is at least 0.5 and a temperature range in which a loss tangent tan δ for a sheet comprised of the second polyvinyl acetal resin layer (B) is at least 0.5.

11. The intermediate sheet as recited in claim 1, characterized in that G'(B)/G'(A) is in the range of 1.0-10, wherein G'(A) is a shear storage modulus at 23° C. at 10 Hz of the first polyvinyl acetal resin layer (A) and G'(B) is a shear storage modulus at 23° C. at 10 Hz of the second polyvinyl acetal resin layer (B).

12. The intermediate sheet as recited in claim 1, characterized in that a ratio in tear strength of the second polyvinyl acetal resin layer (B) to the first polyvinyl acetal resin layer (A), tear strength (B)/tear strength (A), is at least 1.1 when measured according to JIS K 7128.

13. The intermediate sheet as recited in claim 1, characterized in that tensile modulus (B)/tensile modulus (A) is at least 1.1, wherein the tensile modulus (B) is a tensile modulus of the second polyvinyl acetal resin layer (B) and the tensile modulus (A) is a tensile modulus of the first polyvinyl acetal resin layer (A) when both measured at 23° C. at a tensile strain rate of 1,250%/min.

14. The intermediate sheet as recited in claim 1, characterized in that breaking energy (B)/breaking energy (A) is at least 1.1, wherein the breaking energy (B) is a breaking energy of the second polyvinyl acetal resin layer (B) and the breaking energy (A) is a breaking energy of the first polyvinyl acetal resin layer (A) when both measured at 23° C. at a tensile strain rate of 1,250%/min.

15. The intermediate sheet as recited in claim 1, characterized in that maximum point stress (B)/maximum point stress (A) is at least 1.0, wherein the maximum point stress (B) is a maximum point stress of the second polyvinyl acetal resin layer (B) and the maximum point stress (A) is a maximum point stress of the first polyvinyl acetal resin layer (A) when both measured at 23° C. at a tensile strain rate of 1,250%/min.

16. The intermediate sheet as recited in claim 1, characterized in that PVA polymerization degree (B)/PVA polymerization degree (A) is in the range of 0.5-3.0, wherein the PVA polymerization degree (B) is a degree of polymerization of polyvinyl alcohol for constituting the second polyvinyl acetal resin layer (B) and the PVA polymerization degree (A) is a degree of polymerization of polyvinyl alcohol for constituting the first polyvinyl acetal resin layer (A).

17. The intermediate sheet as recited in claim 16, characterized in that PVA polymerization degree (B)/PVA polymerization degree (A) is in the range of 1.0-3.0.

18. The intermediate sheet as recited in claim 1, characterized in that an ester group content of the second polyvinyl acetal resin layer (B) does not exceed 40% by mole.

19. The intermediate sheet as recited in claim 1, characterized in that an ester group content of the second polyvinyl acetal resin layer (B) does not exceed 20% by mole.

20. The intermediate sheet as recited in claim 1, characterized in that the first polyvinyl acetal resin layer (A) and/or the second polyvinyl acetal resin layer (B) contains functional fine particles.

21. The intermediate sheet as recited in claim 1, characterized in that the first polyvinyl acetal resin layer (A) and/or the second polyvinyl acetal resin layer (B) contains a crosslinked polyvinyl acetal resin or comprises an intermolecularly crosslinked polyvinyl acetal resin.

22. The intermediate sheet as recited in claim 1, characterized in that thickness (B)/thickness (A) is in the range of 0.5-10, wherein the thickness (B) is a thickness of the second polyvinyl acetal resin layer (B) and the thickness (A) is a thickness of the first second polyvinyl acetal resin layer (A).

23. The intermediate sheet as recited in claim 1, characterized in that at least one polyvinyl acetal resin layer (B) is interposed between the polyvinyl acetal resin layers (A) having different thicknesses.

24. A laminate including at least one layer of the thermoplastic resin sheet as recited in claim 1.

25. The laminate as recited in claim 24, characterized in that said thermoplastic resin sheet is securely interposed between a glass plate and a transparent resin plate.

26. The laminate as recited in claim 25, characterized in that said transparent resin plate is composed of at least one selected from the group consisting of polycarbonates, acrylic resins, acrylic copolymer resins and polyesters.

27. The laminate as recited in claim 25, characterized in that said transparent resin plate is coated with a transparent elastomer.

28. The laminate as recited in claim 25, characterized in that said thermoplastic resin sheet is securely interposed between a pair of glass plates.

29. The laminate as recited in claim 24, characterized in that at least one of said glass plates is a colored transparent glass plate.

30. The laminate as recited in claim 24, characterized as having a surface density of not higher than 12 kg/m$^2$.

31. The intermediate sheet as recited in claim 1, characterized in that the polyvinyl alcohol has an average degree of polymerization of 500-4,500.

* * * * *